United States Patent
Budagavi

(10) Patent No.: US 9,602,820 B2
(45) Date of Patent: Mar. 21, 2017

(54) VIRTUAL BOUNDARY PROCESSING SIMPLIFICATION FOR ADAPTIVE LOOP FILTERING (ALF) IN VIDEO CODING

(71) Applicant: Texas Instruments Incorporated, Dallas, TX (US)

(72) Inventor: Madhukar Budagavi, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 14/617,140

(22) Filed: Feb. 9, 2015

(65) Prior Publication Data

US 2015/0156490 A1 Jun. 4, 2015

Related U.S. Application Data

(63) Continuation of application No. 13/859,273, filed on Apr. 9, 2013, now Pat. No. 8,983,218.

(60) Provisional application No. 61/622,733, filed on Apr. 11, 2012, provisional application No. 61/665,014, filed on Jun. 27, 2012.

(51) Int. Cl.
| | |
|---|---|
| G06K 9/36 | (2006.01) |
| G06K 9/46 | (2006.01) |
| H04N 19/117 | (2014.01) |
| H04N 19/176 | (2014.01) |
| H04N 19/61 | (2014.01) |
| H04N 19/182 | (2014.01) |
| H04N 19/82 | (2014.01) |
| H04N 19/167 | (2014.01) |
| H04N 19/192 | (2014.01) |

(52) U.S. Cl.
CPC ......... *H04N 19/117* (2014.11); *H04N 19/167* (2014.11); *H04N 19/176* (2014.11); *H04N 19/182* (2014.11); *H04N 19/192* (2014.11); *H04N 19/61* (2014.11); *H04N 19/82* (2014.11)

(58) Field of Classification Search
None
See application file for complete search history.

(56) References Cited

U.S. PATENT DOCUMENTS

| | | | | |
|---|---|---|---|---|
| 4,937,878 A | * | 6/1990 | Lo | G06T 7/2053 382/103 |
| 7,738,465 B2 | * | 6/2010 | Akahane | H04L 12/2602 370/352 |
| 2005/0013300 A1 | * | 1/2005 | Akahane | H04L 12/2602 370/395.3 |
| 2013/0044809 A1 | | 2/2013 | Chong et al. | |

(Continued)

OTHER PUBLICATIONS

Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, pp. 1-215, Mar. 16-23, 2011, Geneva, Switzerland.

(Continued)

*Primary Examiner* — Feng Niu
(74) *Attorney, Agent, or Firm* — Gregory J. Albin; Charles A. Brill; Frank D. Cimino

(57) ABSTRACT

Virtual boundary processing in adaptive loop filtering (ALF) requires that padded values be substituted for unavailable pixel rows outside the virtual boundaries. Methods and apparatus are provided for virtual boundary processing in ALF that allow the use of more actual pixel values for padding than in the prior art.

4 Claims, 35 Drawing Sheets

(56) References Cited

U.S. PATENT DOCUMENTS

2013/0322523 A1    12/2013  Huang et al.
2014/0355695 A1*   12/2014  Lim .................. H04N 19/86
                                                375/240.29

OTHER PUBLICATIONS

Madhukar Budagavi et al, "HEVC ALF Decode Complexity Analysis and Reduction", 2011 18th IEEE International Conference on Image Processing (ICIP), pp. 733-736, Sep. 11-14, 2011, Brussels, Belgium.
Ching-Yeh Chen et al, "Non-CE8.c.7: Single-Source SAO and ALF Virtual Boundary Processing with Cross9x9", JCTVC-G212, Joint Collaborative Team on Video Coding (JCT-VC) of ITU-T SG16 WP3 and ISO/IEC JTC1/SC29/WG11, pp. 1-25, Nov. 21-30, 2011, Geneva, Switzerland.
Ching-Yeh Chen et al, "Non-CE8.c.7: Single-source SAO and ALF Virtual Boundary Processing with Cross9x9", JCTVC-G212 Presentation, Joint Collaborative Team on Video Coding (JCT-VC) of ITU-T SG16 WP3 and ISO/IEC JTC1/SC29/WG11, pp. 1-11, Nov. 21-30, 2011, Geneva, Switzerland.
Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, pp. 1-214, Jul. 14-22, 2011, Torino, Italy.
A. Benkrid and K. Benkrid, "Novel Area-Efficient FPGA Architectures for FIR Filtering with Symmetric Signal Extension", IEEE Transactions on Very Large Scale Integration (VLSI) Systems, vol. 17, Issue 5, pp. 709-722, May 2009.
Benjamin Bross et al, "WD5: Working Draft 5 of High-Efficiency Video Calling", JCTVC-G1103_d9, Joint Collaborative Team on Video Coding (JCT-VC) of ITU-T SG16 WP3 and ISO/IEC JTC1/SC29/WG11, pp. 1-223, Nov. 21-30, 2011, Geneva, Switzerland.
Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, pp. 1-260, Jul. 11-20, 2012, Stockholm, Sweden.
Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, pp. 1-249, Nov. 21-30, 2011, Geneva, Switzerland.
Benjamin Bross et al, "High Efficiency Video Coding (HEVC) Text Specification Draft 7", JCTVC-I1003_d1, Joint Collaborative Team on Video Coding (JCT-VC) of ITU-T SG16 WP3 and ISO/IEC JTC1/SC29/WG11, pp. 1-256, Apr. 27-May 7, 2012, Geneva, Switzerland.
Madhukar Budagavi, "CE8.b: ALF with Single Filter Type", JCTVC-H0068, Joint Collaborative Team on Video Coding (JCT-VC) of ITU-T SG16 WP3 and ISO/IEC JTC1/SC29/WG11, pp. 1-5, Feb. 1-10, 2012, San Jose, CA.
Benjamin Bross et al, "High Efficiency Video Coding (HEVC) Text Specification Draft 9", JCTVC-K1003_v13, Joint Collaborative Team on Video Coding (JCT-VC) of ITU-T SG16 WP3 and ISO/IEC JTC1/SC29/WG11, pp. 1-293, Oct. 10-19, 2012, Shanghai, China.
"TMS320DM6467 Digital Media System-on-Chip", SPRS403G, Texas Instruments Incorporated, Dec. 2007, revised Oct. 2010, pp. 1-355.
"Quadtree-Based Adaptive Loop Filter", COM16-C181-E, International Telecommunication Union (ITU)—Telecommunication Standardization Sector, Study Group 16, Contribution 181, Question 6/16, pp. 1-4, Jan. 2009.
"Adaptive (Wiener) Filter for Video Compression", COM16-C437R1-E, International Telecommunication Union (ITU)—Telecommunication Standardization Sector, Study Group 16, Contribution 437, Question 6/16, pp. 1-7, Apr. 2008.
Takeshi Chujoh et al, "Block-Based Adaptive Loop Filter", VCEG-AI18, International Telecommunication (ITU)—Telecommunication Standardization Sector, Study Group 16, Question 6, pp. 1-7, Jul. 16-18, 2008, Berlin, Germany.
Marta Karczewicz et al, "A Hybrid Video Coder Based on Extended Macroblock Sizes, Improved Interpolation and Flexible Motion Representation", IEEE Transactions on Circuits and Systems for Video Technology, vol. 20, Issue 12, pp. 1698-1708, Dec. 2010.

\* cited by examiner

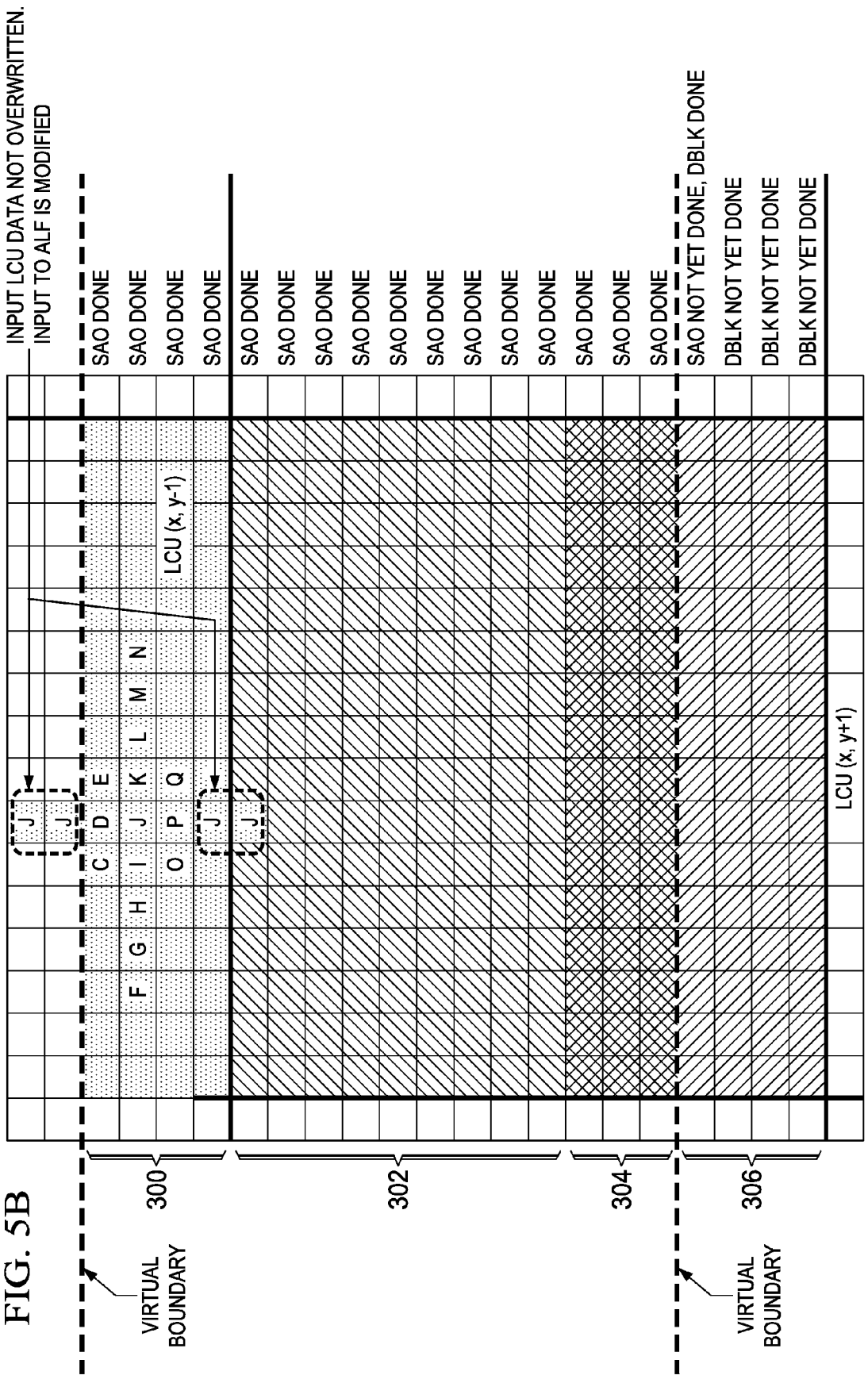

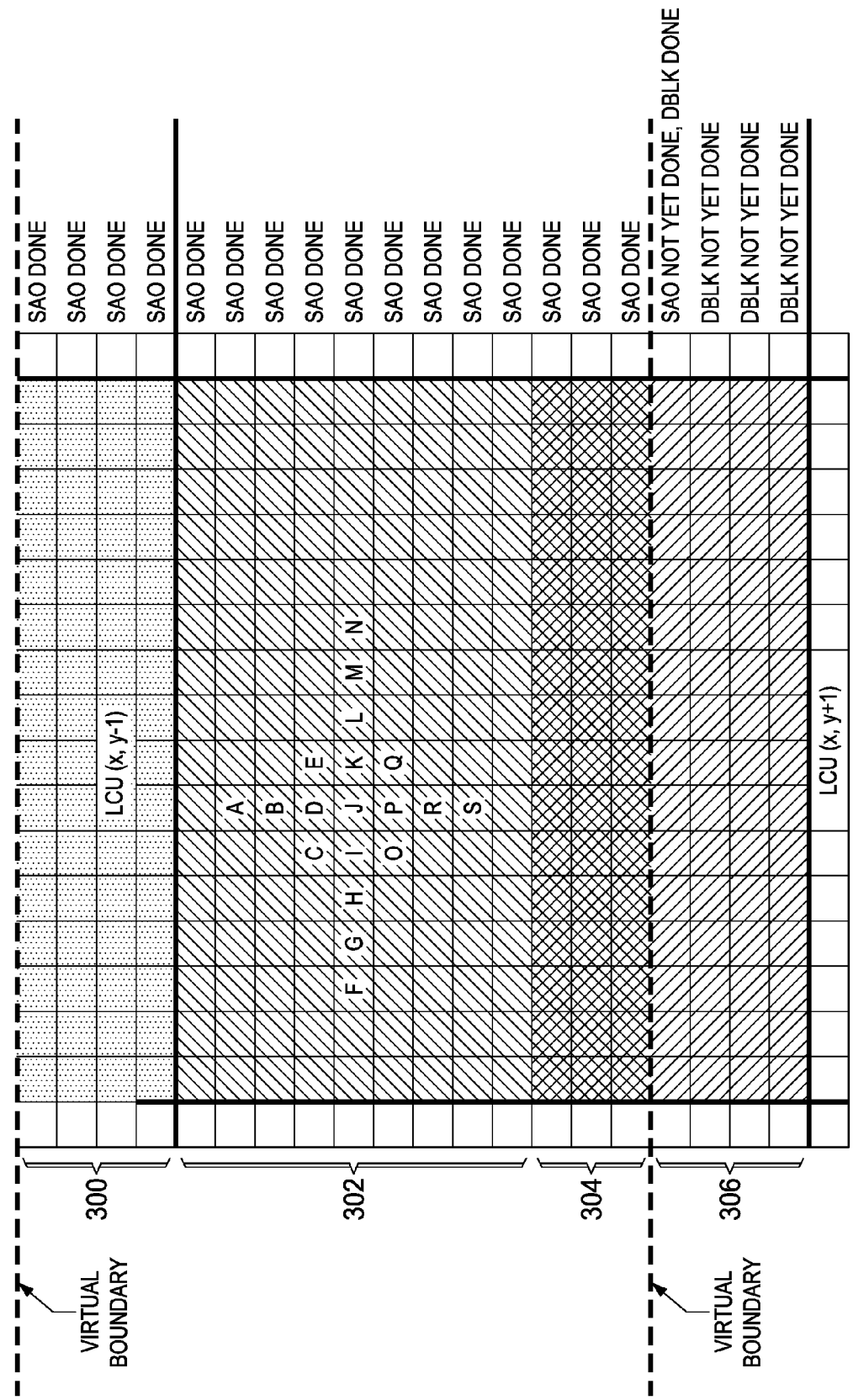

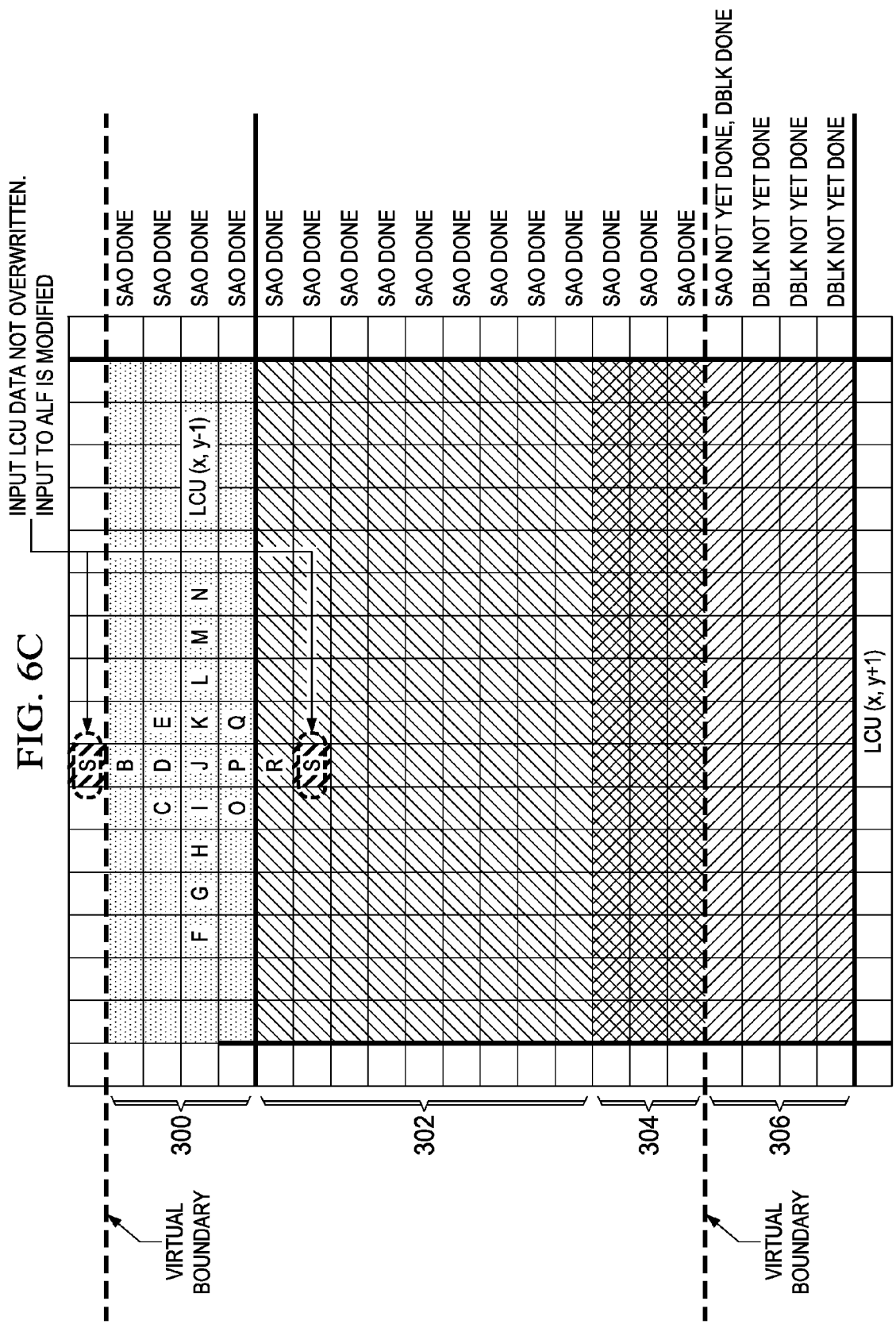

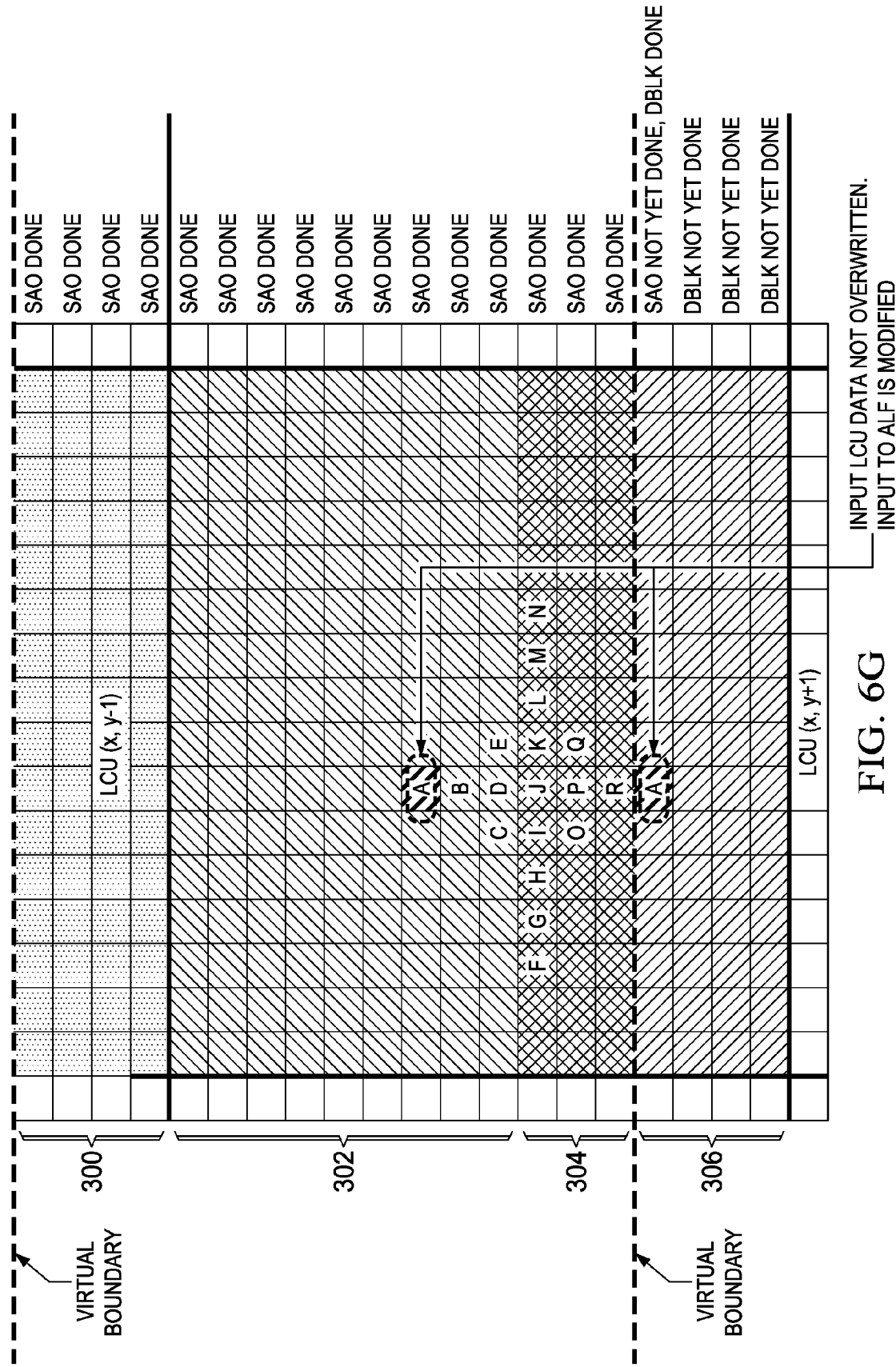

VIRTUAL BOUNDARY PROCESSING SIMPLIFICATION FOR ADAPTIVE LOOP FILTERING (ALF) IN VIDEO CODING

CROSS-REFERENCE TO RELATED APPLICATIONS

This application is a continuation of and claims priority to U.S. patent application Ser. No. 13/859,273, filed Apr. 9, 2013, which claims benefit of U.S. Provisional Patent Application Ser. No. 61/622,733, filed Apr. 11, 2012, and U.S. Provisional Patent Application Ser. No. 61/665,014, filed Jun. 27, 2012, which are incorporated herein by reference in their entirety.

BACKGROUND OF THE INVENTION

Field of the Invention

Embodiments of the present invention generally relate to virtual boundary processing in adaptive loop filtering in video coding.

Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). HEVC is expected to provide around 50% improvement in coding efficiency over the current standard, H.264/AVC, as well as larger resolutions and higher frame rates. To address these requirements, HEVC utilizes larger block sizes than H.264/AVC. In HEVC, the largest coding unit (LCU) can be up to 64×64 in size, while in H.264/AVC, the macroblock size is fixed at 16×16.

Adaptive loop filtering (ALF) is a new coding tool proposed for HEVC. In general, ALF is an adaptive Wiener filtering technique applied after the deblocking filter to improve the reference picture used for encoding/decoding of subsequent pictures. The original ALF concept is explained in more detail in Y. Chiu and L. Xu, "Adaptive (Wiener) Filter for Video Compression," ITU-T SG16 Contribution, C437, Geneva, CH, April 2008. As originally proposed, ALF used square filters and was carried out on entire deblocked pictures. Subsequently, block-based adaptive loop filtering was proposed in which ALF could be enabled and disabled on a block, i.e., coding unit, basis. In block-based ALF, the encoder signals to the decoder the map of blocks of a deblocked picture on which ALF is to be applied. Block-based ALF is described in more detail in T. Chujoh, et al., "Block-based Adaptive Loop Filter," ITU-T SG16 Q.6 Document, VCEG-A118, Berlin, Del., July 2008.

A further refinement to block-based ALF, quadtree adaptive loop filtering, was subsequently proposed in which the map of blocks was signaled using a quadtree. Quad-tree ALF is described in more detail in T. Chujoh, et al., "Quadtree-based Adaptive Loop Filter," ITU-T SG16 Contribution, C181, January 2009. The use of diamond shaped rather than square shaped ALF filters was then proposed to reduce computational complexity. Diamond shaped ALF filters for luma components are described in more detail in M. Karczewicz, et al., "A Hybrid Video Coder Based on Extended Macroblock Sizes, Improved Interpolation, and Flexible Motion Representation," IEEE Trans. on Circuits and Systems for Video Technology, pp. 1698-1708, Vol. 20, No. 12, December 2010.

SUMMARY

Embodiments of the present invention relate to methods and apparatus for adaptive loop filtering in video coding. In one aspect, a method for adaptive loop filtering of a reconstructed picture is provided that includes determining filter coefficients for a symmetric two-dimensional (2D) finite impulse response (FIR) filter to be applied to a reconstructed largest coding unit (LCU) of the reconstructed picture, applying the symmetric 2D FIR filter to a pixel $p(x, y)$ to compute a first filtered pixel value, wherein the pixel $p(x, y)$ is in a row of reconstructed pixels at a top virtual boundary of the reconstructed LCU, wherein the pixel $p(x, y)$ is at a center of the symmetric filter, and wherein a value of the pixel $p(x, y)$ is replicated for a value of an unavailable pixel $p(x, y-1)$ above the top virtual boundary, a value of a pixel $p(x-1, y)$ is replicated for a value of an unavailable pixel $p(x-1, y-1)$ above the top virtual boundary, and a value of a pixel $p(x-1, y)$ is replicated for a value of an unavailable pixel $p(x-1, y-1)$ above the top virtual boundary, applying the symmetric 2D FIR filter to a pixel $q(x, y)$ to compute a second filtered pixel value, wherein the pixel $q(x, y)$ is in a row of reconstructed pixels at a bottom virtual boundary of the reconstructed LCU, wherein the pixel $q(x, y)$ is at a center of the symmetric filter, and wherein a value of the pixel $q(x, y)$ is replicated for a value of an unavailable pixel $q(x, y-1)$ below the bottom virtual boundary, a value of a pixel $q(x-1, y)$ is replicated for a value of an unavailable pixel $q(x-1, y+1)$ below the bottom virtual boundary, and a value of a pixel $q(x-1, y)$ is replicated for a value of an unavailable pixel $q(x-1, y-1)$ below the bottom virtual boundary, and outputting the first and second filtered pixel values.

In one aspect, a method for adaptive loop filtering of a reconstructed picture is provided that includes determining filter coefficients for a symmetric two-dimensional (2D) finite impulse response (FIR) filter to be applied to a reconstructed largest coding unit (LCU) of the reconstructed picture, applying the symmetric 2D FIR filter to a pixel $p(x, y)$ to compute a first filtered pixel value, wherein the pixel $p(x, y)$ is in a row of reconstructed pixels at a top virtual boundary of the reconstructed LCU, wherein the pixel $p(x, y)$ is at a center of the symmetric filter, and wherein a value of a pixel $p(x, y+1)$ is replicated for a value of an unavailable pixel $p(x, y-1)$ above the top virtual boundary, a value of a pixel $p(x-1, y+1)$ is replicated for a value of an unavailable pixel $p(x-1, y-1)$ above the top virtual boundary, and a value of a pixel $p(x+1, y+1)$ is replicated for a value of an unavailable pixel $p(x+1, y-1)$ above the top virtual boundary, applying the symmetric 2D FIR filter to a pixel $q(x, y)$ to compute a second filtered pixel value, wherein the pixel $q(x, y)$ is in a row of reconstructed pixels at a bottom virtual boundary of the reconstructed LCU, wherein the pixel $q(x, y)$ is at a center of the symmetric filter, and wherein a value of the pixel $q(x, y-1)$ is replicated for a value of an unavailable pixel $q(x, y+1)$ below the bottom virtual boundary, a value of a pixel $q(x-1, y-1)$ is replicated for a value of an unavailable pixel $q(x-1, y+1)$ below the bottom virtual boundary, and a value of a pixel $q(x+1, y-1)$ is replicated for a value of an unavailable pixel q(x+1, y+1) below the bottom virtual boundary, and outputting the first and second filtered pixel values.

In one aspect, an apparatus configured for applying an adaptive loop filter to reconstructed pixel values of a reconstructed largest coding unit (LCU) of a reconstructed picture is provided wherein the adaptive loop filter is a symmetric two-dimensional (2D) finite impulse response (FIR) filter. The apparatus includes a filter circuit configured to perform the computational operations of the symmetric 2D FIR filter, wherein the filter circuit includes one input for each vertical coefficient position of the symmetric 2D FIR filter, and a router including an input and an output for each vertical coefficient position of the symmetric 2D FIR filter, wherein each router output is operatively connected to a unique one of the filter circuit inputs, wherein each router input is operatively connected to receive reconstructed pixel values from a unique one of consecutive rows within horizontal virtual boundaries of the reconstructed LCU, wherein a central row in the consecutive rows includes reconstructed pixels to be filtered and is operatively connected to a central router input, and wherein the router is configured to direct pixel values received at the router inputs to the router outputs based on a value of a region identifier, wherein when a value of the region identifier corresponds to a region of the reconstructed LCU including a row of reconstructed pixels at a top horizontal virtual boundary of the reconstructed LCU and a row of reconstructed pixels at a bottom horizontal virtual boundary of the reconstructed LCU, the router directs reconstructed pixel values received at the central router input to all router outputs.

BRIEF DESCRIPTION OF THE DRAWINGS

Particular embodiments will now be described, by way of example only, and with reference to the accompanying drawings:

FIGS. 5A-5I are an example illustrating a technique for virtual boundary processing in ALF;

FIGS. 6A-6I are an example illustrating a technique for virtual boundary processing in ALF;

DETAILED DESCRIPTION OF EMBODIMENTS OF THE INVENTION

Figure 1:
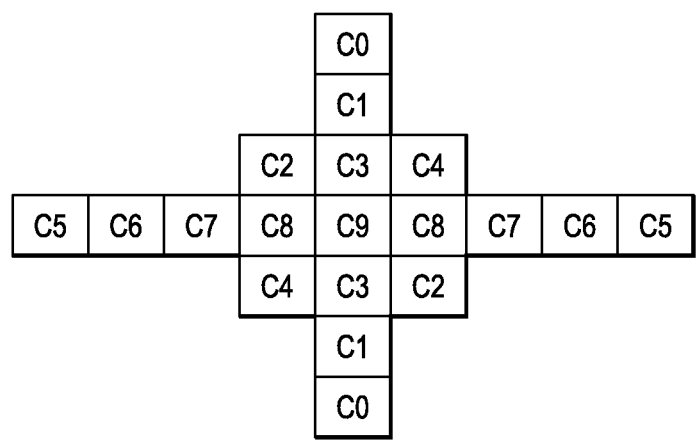
FIG. 1 is an example of a symmetric two-dimensional (2D) finite impulse response (FIR) filter used for adaptive loop filtering (ALF)

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments of the invention are described herein in reference to HEVC. One of ordinary skill in the art will understand that embodiments of the invention are not limited to HEVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, and 32×32. The sizes of the transforms units and prediction units for a CU are determined by the video encoder during prediction based on minimization of rate/distortion costs.

As previously discussed, adaptive loop filtering (ALF) is a new coding tool proposed in HEVC. In general, the filter used for ALF is a symmetric two-dimensional (2D) finite impulse response (FIR) filter. This filter may be referred to as an ALF filter herein. The filter parameters (coefficients) are determined using a standard Weiner filtering technique in which the objective is to determine parameters such that the mean squared error between the original input pixels and the filtered reconstructed pixels is minimized. The filter coefficients may be transmitted per picture, slice, or LCU. As currently proposed, the filter used for ALF is a 10-tap symmetric 2D FIR filter of the shape shown in FIG. 1.

Figure 2:
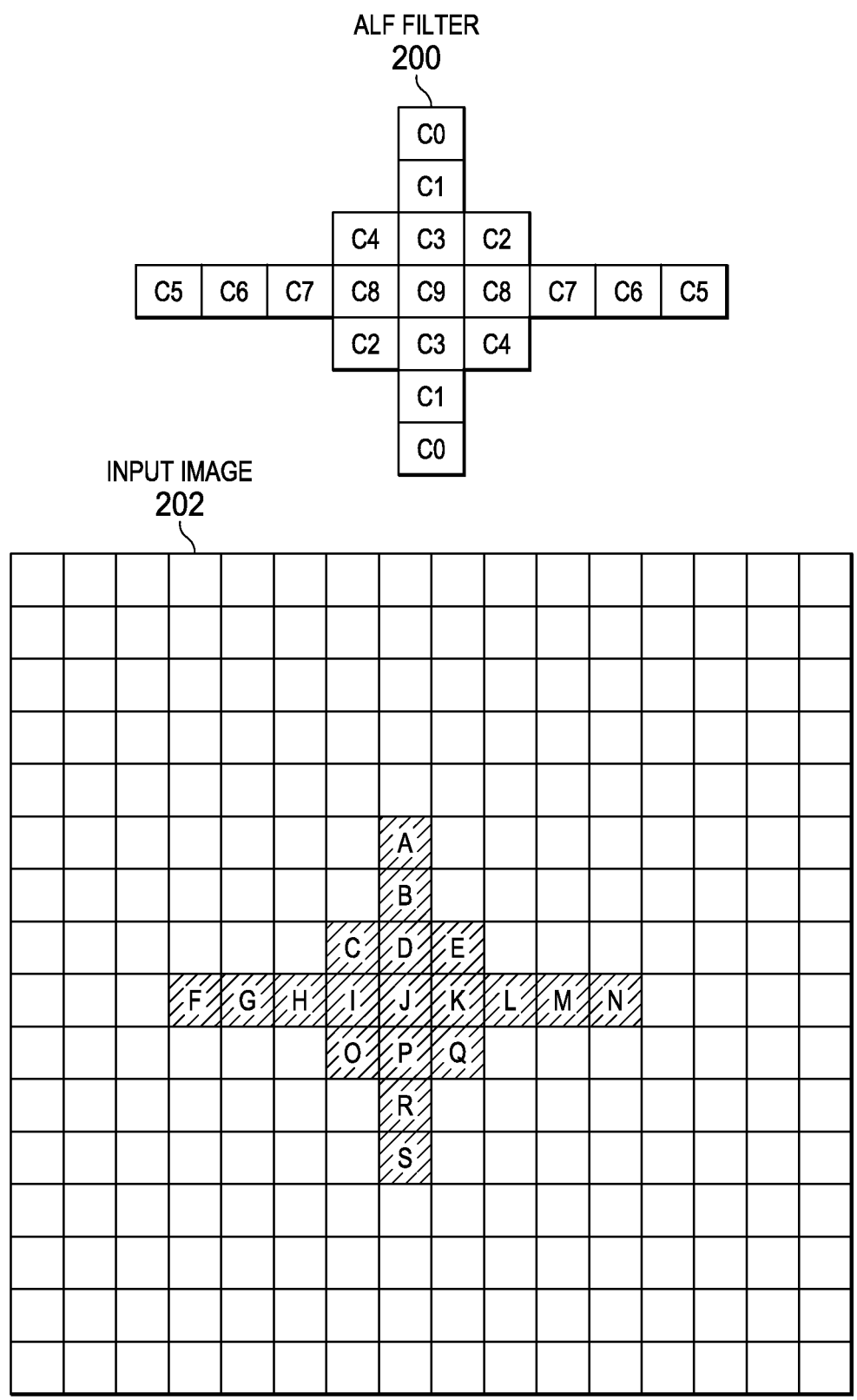
FIG. 2 is an example illustrating application of the filter of FIG. 1.

To apply the filter of FIG. 1, computation of each output pixel value requires access to nineteen pixels. FIG. 2 is an example illustrating this computation for one pixel. In this example, the ALF filter 200 is located in the input image 202 centered on the pixel labeled J. Each of the pixel locations that are used in the computation of the filtered output value of J are alphabetically labeled in the image 202 and each of the coefficient positions of the filter are labeled in the ALF filter 200. This notation is used throughout the description of the prior art and the description of embodiments of the invention. Note that if J is the pixel $p(x, y)$, then I is the pixel $p(x-1, y)$, K is the pixel $p(x+1, y)$, C is the pixel $p(x-1, y-1)$, D is the pixel $p(x, y-1)$, E is the pixel $p(x+1, y+1)$, O is the pixel $p(x-1, y+1)$, P is the pixel $p(x, y+1)$, Q is the pixel $p(x+1, y+1)$, etc. The bit width of coefficient values at coefficient position C9 is 9-bits unsigned (0:511) and the bit width of coefficient values at coefficient positions C0-C8 is 9-bits signed (−256:255). The filtered output value of the pixel J is computed as: Output=C0*(A+S)+C1*(B+R)+C2*(C+Q)+C3*(D+P)+C4*(E+O)+C5*(F+N)+C6*(G+M)+C7*(H+L)+C8*(I+K)+C9*J.

If the frame buffer storing the reconstructed pixels is stored in external memory, the ALF filter computations can lead to excessive external memory bandwidth requirements.

In an earlier version of HEVC, the use of six line buffers for LCU-based application of the ALF filter was proposed to reduce the memory bandwidth requirements. In the current version of HEVC, ALF uses an alternate technique called virtual boundary processing to eliminate line buffer requirement. This virtual boundary processing is similar in spirit to pixel padding but is modified to ensure symmetry of input for the ALF filter. The prior line buffer based application of ALF and the current virtual boundary processing are described in C. Chen, et al., "Non-CE8.c.7: Single-Source SAO and ALF Virtual Boundary Processing with Cross9× 9," JCTVC-G212, Joint Collaborative Team on Video Coding (JCT-VC) of ITU-T SG16 WP3 and ISO/IEC JTC1/SC29/WG11, pp. 1-25, November 21-30, Geneva, CH. FIGS. 3A-3J are an example illustrating the current virtual boundary processing for the luma component of an LCU.

Figure 3A:
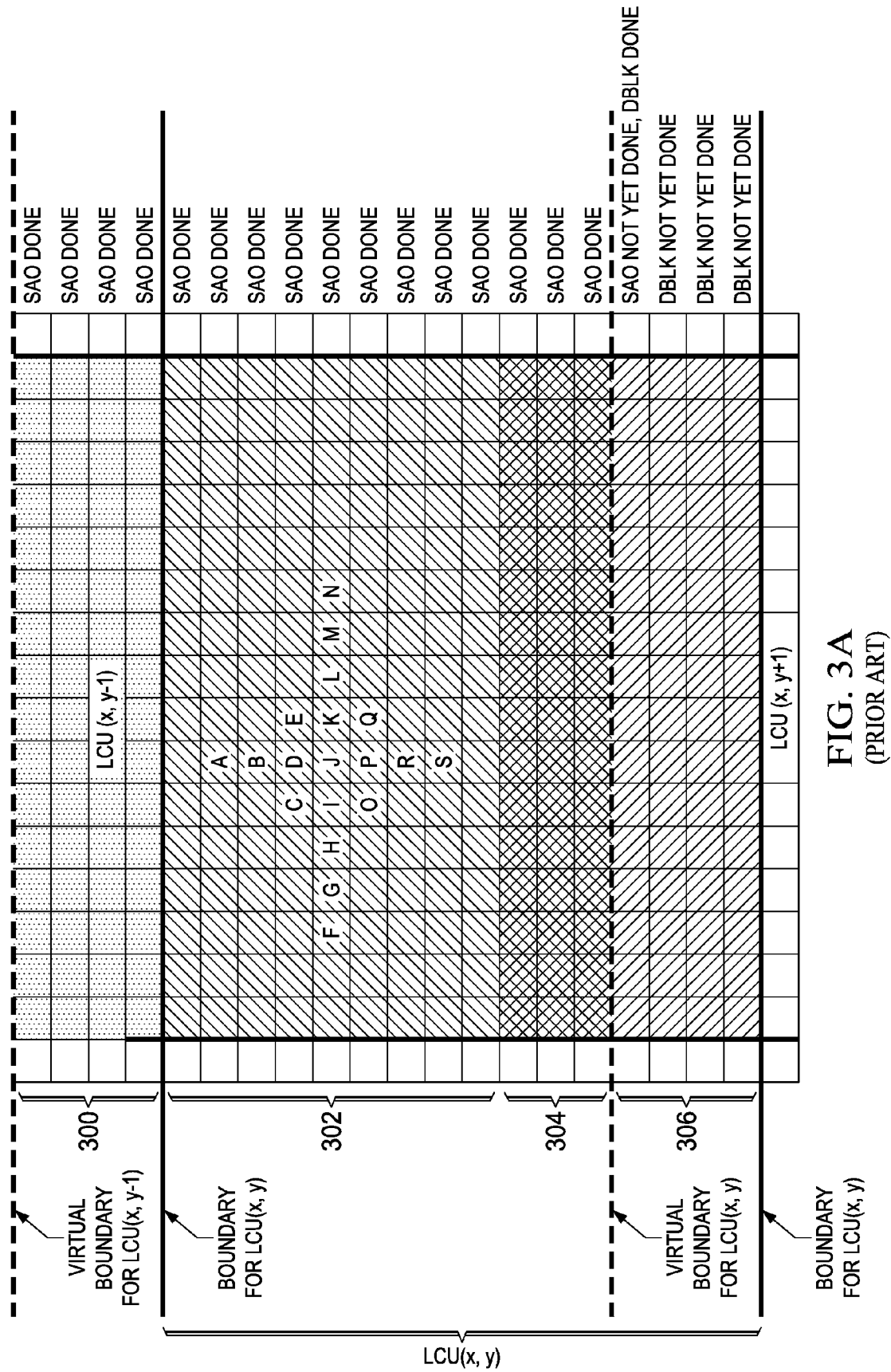
FIGS. 3A-3J are an example illustrating prior art virtual boundary processing in ALF.

Referring first to FIG. 3A, as previously mentioned, ALF is performed on reconstructed pixels that have been deblock filtered and SAO filtered (if turned on). When ALF is applied on an LCU-by-LCU basis, deblock filtering and SAO filtering have not yet been completed for the bottom four rows of pixels in an LCU (x, y). Thus, these pixels are not available. Rather than incurring the delay of waiting for the bottom four rows to be fully filtered, virtual boundaries are used for the ALF filtering process. These virtual boundaries correspond to the horizontal boundaries of the LCU (x, y) upward shifted by four rows of pixels. The virtual LCU thus created includes four rows of the immediate top neighboring LCU (x, y−1) and omits the bottom four rows of LCU (x, y). The top virtual boundary of the virtual LCU corresponds to the lower virtual boundary of the immediate top neighboring LCU (x, y−1). Note that the pixels in the virtual LCU bounded by these virtual boundaries have been deblock and SAO filtered. As will be apparent from the description of the other figures of this example, the pixels in region 306 are filtered when the immediate bottom neighboring LCU (x, y+1) is processed, and the application of ALF filtering in the other "shaded" regions 300, 302, 304 differs.

Figure 3B:
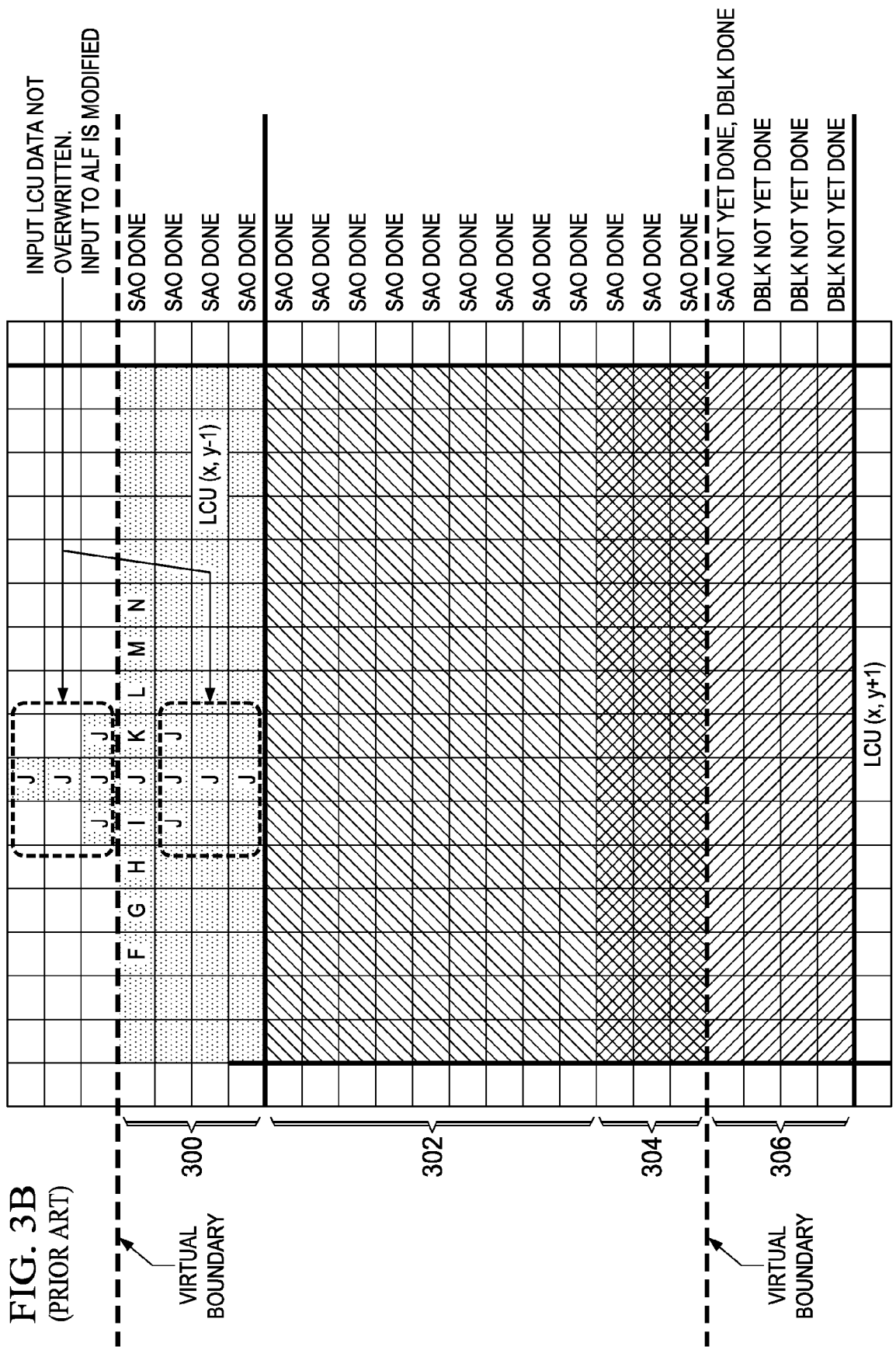

FIGS. 3B-3E illustrate application of the ALF filter to the pixels of region 300, i.e., the rows of pixels within the virtual boundaries that are from the immediate top neighboring LCU (x, y−1). As is well-known, the coefficients of the ALF filter may vary from LCU to LCU. As the pixels in region 300 are from the top neighboring LCU(x, y−1), the coefficients of the filter selected for that LCU are used to filter pixels in this region. FIG. 3B illustrates the computation of output filtered pixel values for the top row of region 300. As shown in FIG. 3B, to filter pixels in this row, pixel values are needed from the three rows above this row in LCU(x, y−1), i.e., from the three rows above the top virtual boundary (VB). The pixel values in these three rows are unavailable. Rather than storing the needed pixel values until this first row is filtered, padded values are substituted for the unavailable pixels. In particular, the value of the center pixel J is replicated for each of the unavailable pixels. Further, to preserve the symmetry of the filtering, the value of the center pixel J also replaces the corresponding pixel values needed from the corresponding three rows below the top row. Thus, the filter output value for a pixel J in the top row of region 300 (assuming all pixels to the right and left of J are available) is computed as: Output=C0*(J+J)+C1*(J+J)+C2*(J+J)+C3*(J+J)+C4*(J+J)+C5*(F+N)+C6*(G+M)+C7*(H+L)+C8*(I+K)+C9*J.

Figure 3C:
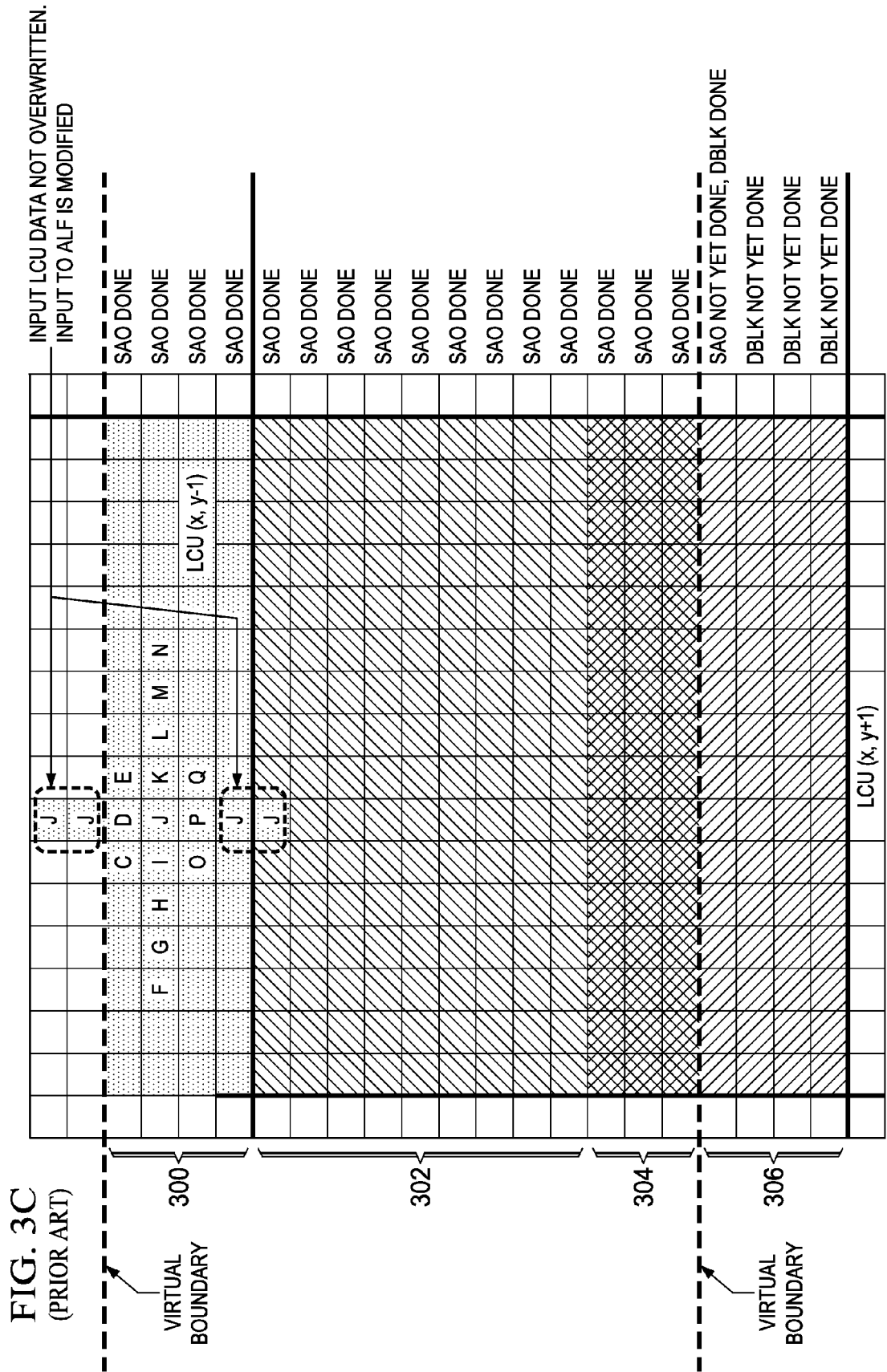

FIG. 3C illustrates the computation of output filtered pixel values for the second row of region 300. As shown in FIG. 3C, to filter pixels in this row, pixel values are needed from the two rows above the top virtual boundary (VB) in LCU(x, y−1). Similar to the filtering computations for the first row, padded values are substituted for the unavailable pixels. In particular, the value of the center pixel J is replicated for each of the unavailable pixels. Further, to preserve the symmetry of the filtering, the value of the center pixel J also replaces the corresponding pixel values needed from the corresponding two rows below the second row. Thus, the filter output value for a pixel J in the second row of region 300 (assuming all pixels to the right and left of J are available) is computed as: Output=C0*(J+J)+C1*(J+J)+C2*(C+Q)+C3*(D+P)+C4*(E+O)+C5*(F+N)+C6*(G+M)+C7*(H+L)+C8*(I+K)+C9*J.

Figure 3D:
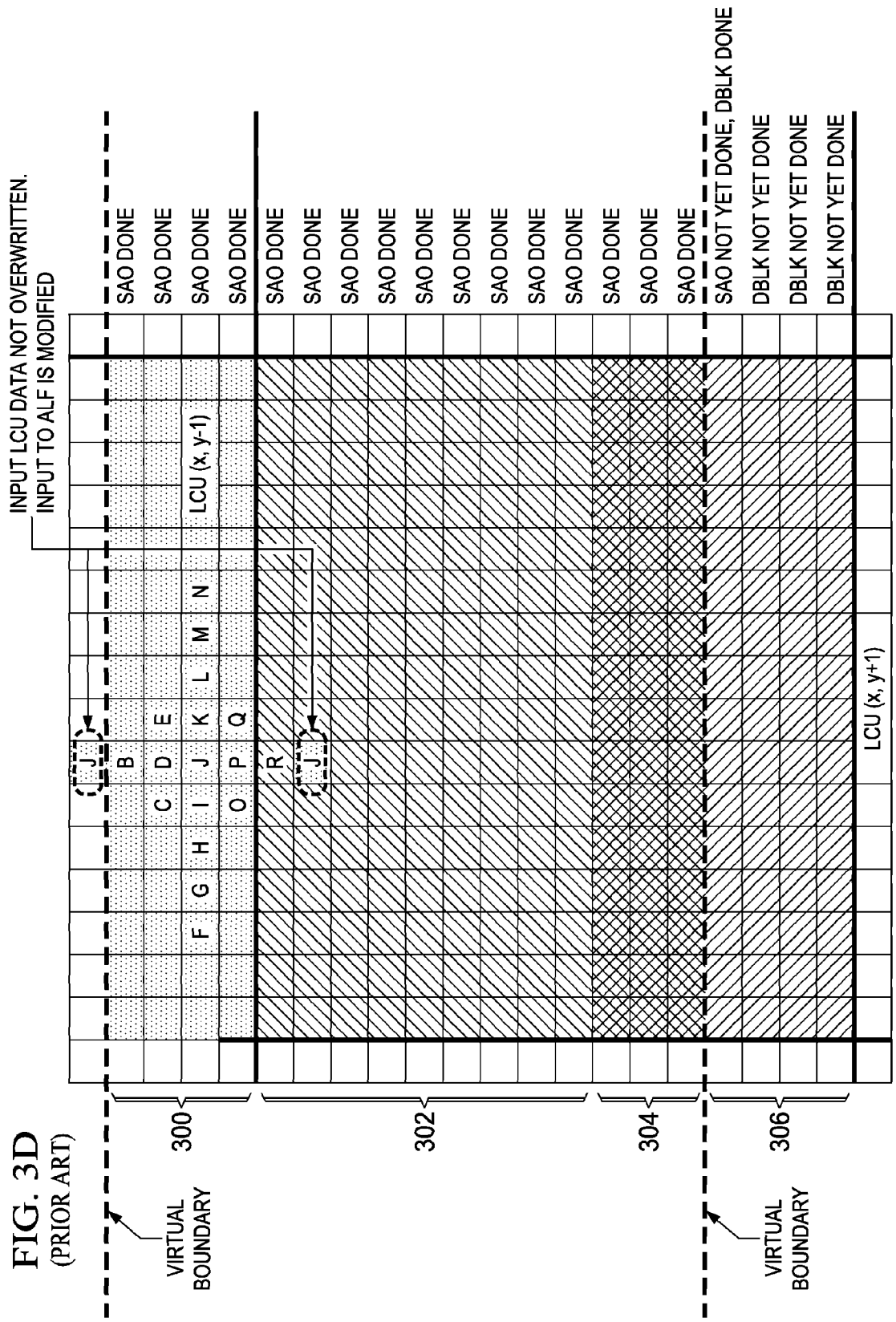

FIG. 3D illustrates the computation of output filtered pixel values for the third row of region 300. As shown in FIG. 3D, to filter pixels in this row, pixel values are needed from the row above the top virtual boundary (VB) in LCU(x, y−1). Similar to the filtering computations for the first and second rows, padded values are substituted for the unavailable pixels. In particular, the value of the center pixel J is replicated for the unavailable pixel. Further, to preserve the symmetry of the filtering, the value of the center pixel J also replaces the corresponding pixel value needed from the corresponding row below the third row. Thus, the filter output value for a pixel J in the third row of region 300 (assuming all pixels to the right and left of J are available) is computed as: Output=C0*(J+J)+C1*(B+R)+C2*(C+Q)+C3*(D+P)+C4*(E+O)+C5*(F+N)+C6*(G+M)+C7*(H+L)+C8*(I+K)+C9*J.

Figure 3E:
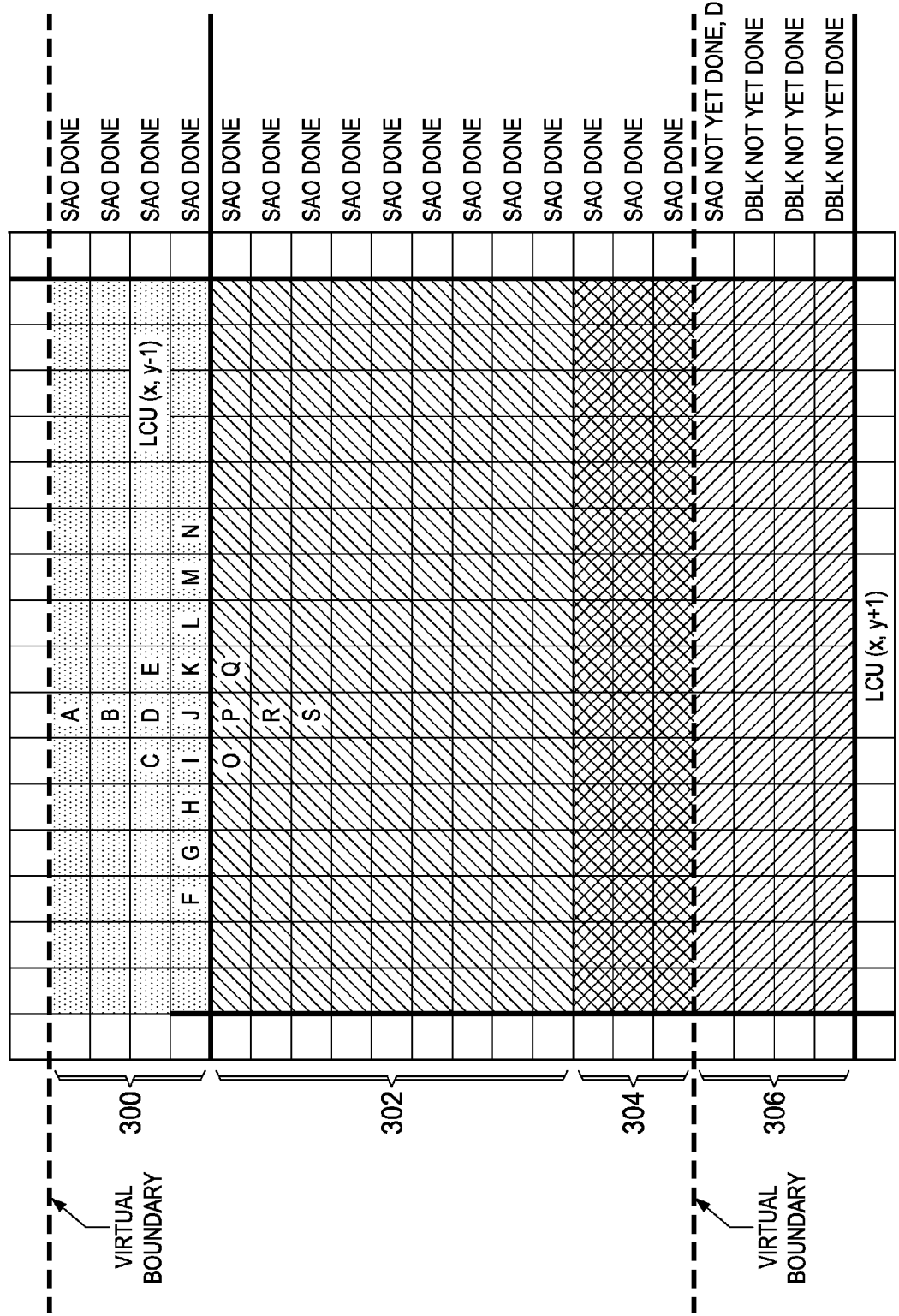

FIG. 3E illustrates the computation of output filtered pixel values for the fourth row of region 300. As shown in FIG. 3E, the pixel values from the rows above and below this row that are needed to filter the pixels in this row are available. Thus, no padding is needed and the filter output value for a pixel J in the fourth row of region 300 (assuming all pixels to the right and left of J are available) is computed as: C0*(A+S)+C1*(B+R)+C2*(C+Q)+C3*(D+P)+C4*(E+O)+C5*(F+N)+C6*(G+M)+C7*(H+L)+C8*(I+K)+C9*J.

Figure 3F:
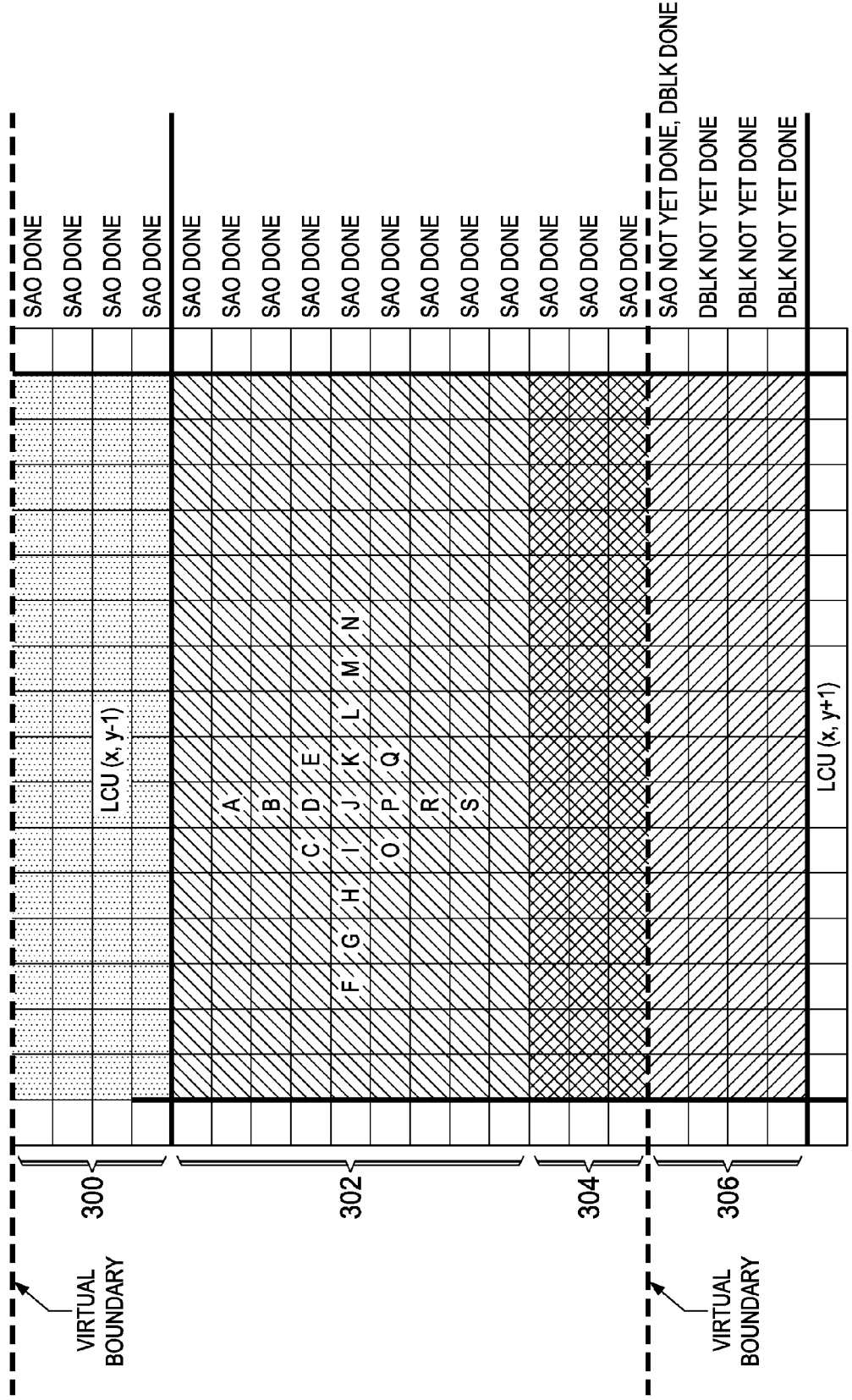
Figure 3G:
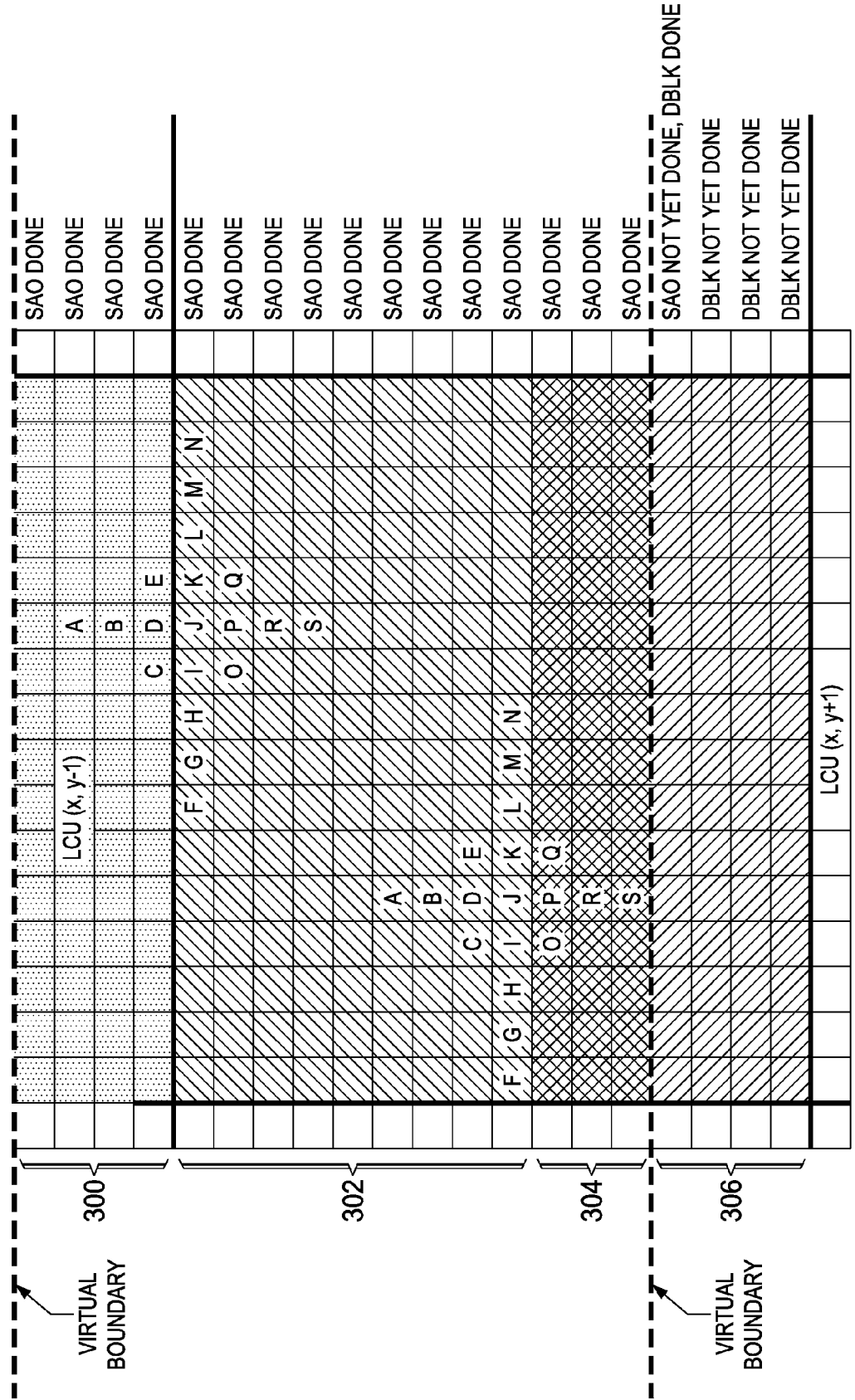

FIGS. 3F and 3G illustrate application of the ALF filter to the pixels of region 302. This region includes rows of pixels within the virtual boundaries that are from the current LCU (x, y). Thus, the coefficients of the filter selected for the current LCU (x, y) are used to filter pixels in this region. As is apparent in FIGS. 3F and 3G, the pixel values from the rows above and below each of the rows in this region that are needed to filter the pixels in the row are available. Thus, no padding is needed and the filter output value for a pixel J in any row of region 302 (assuming all pixels to the right and left of J are available) is computed as: C0*(A+S)+C1*(B+R)+C2*(C+Q)+C3*(D+P)+C4*(E+O)+C5*(F+N)+C6*(G+M)+C7*(H+L)+C8*(I+K)+C9*J.

Figure 3H:
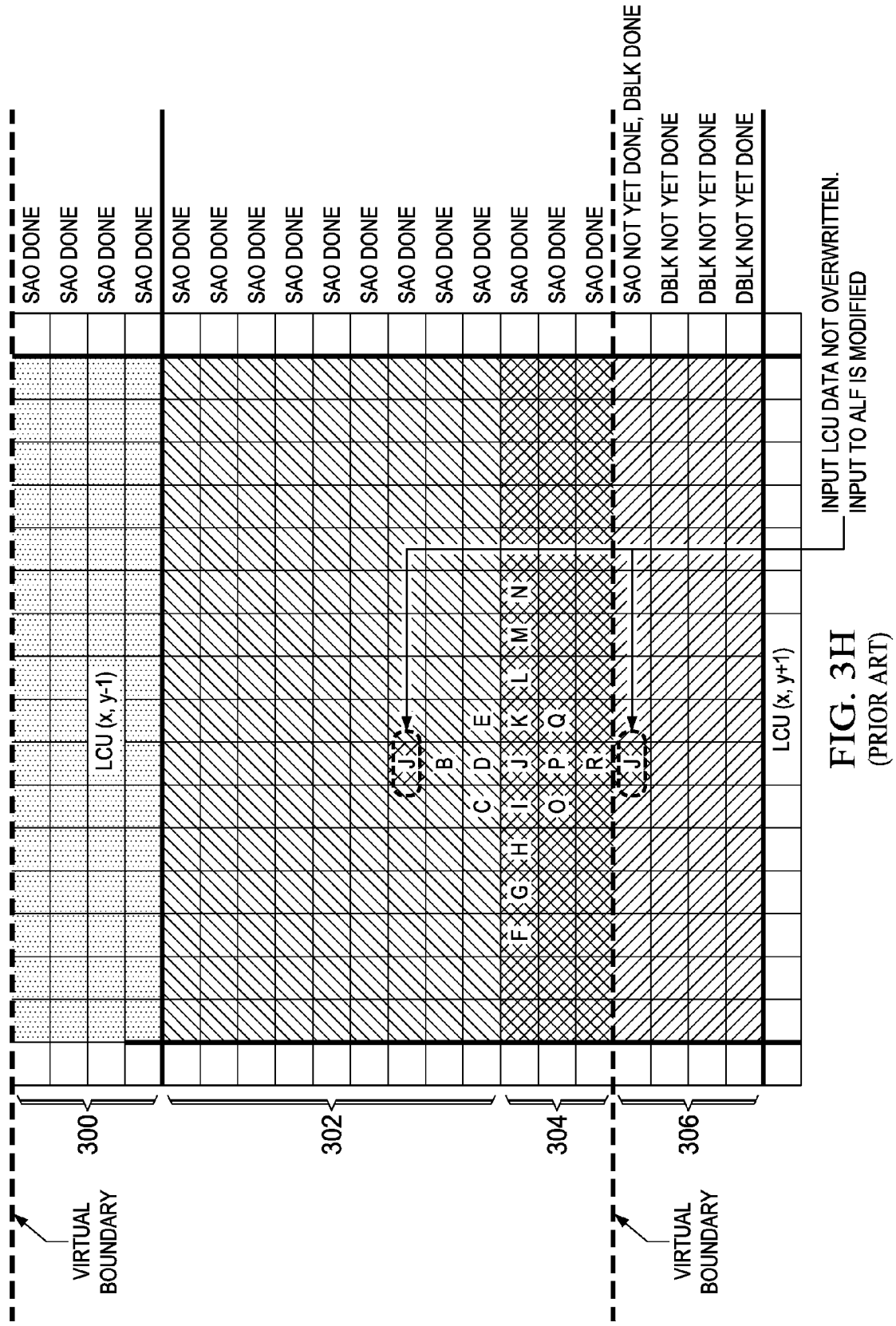
Figure 3I:
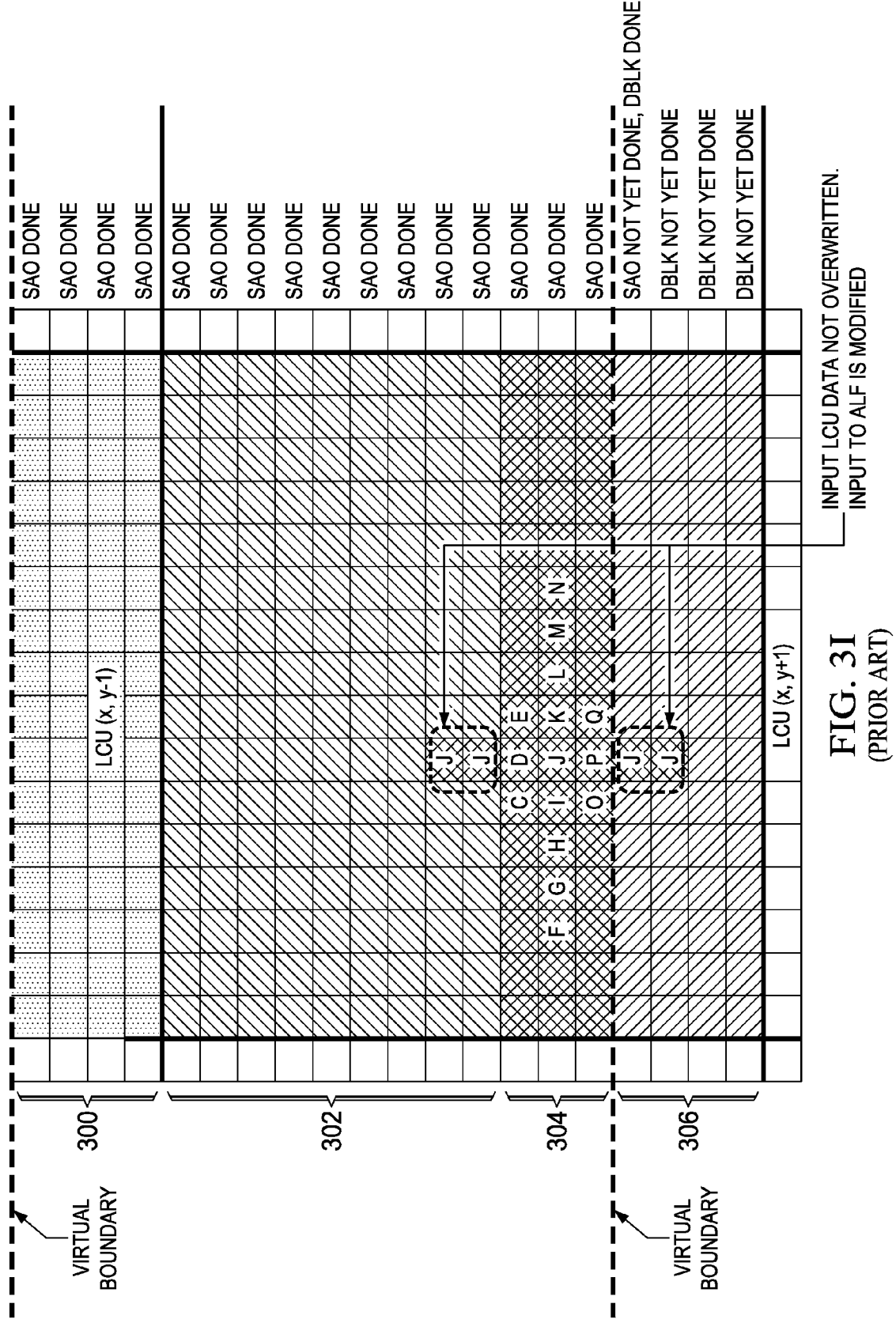
Figure 3J:
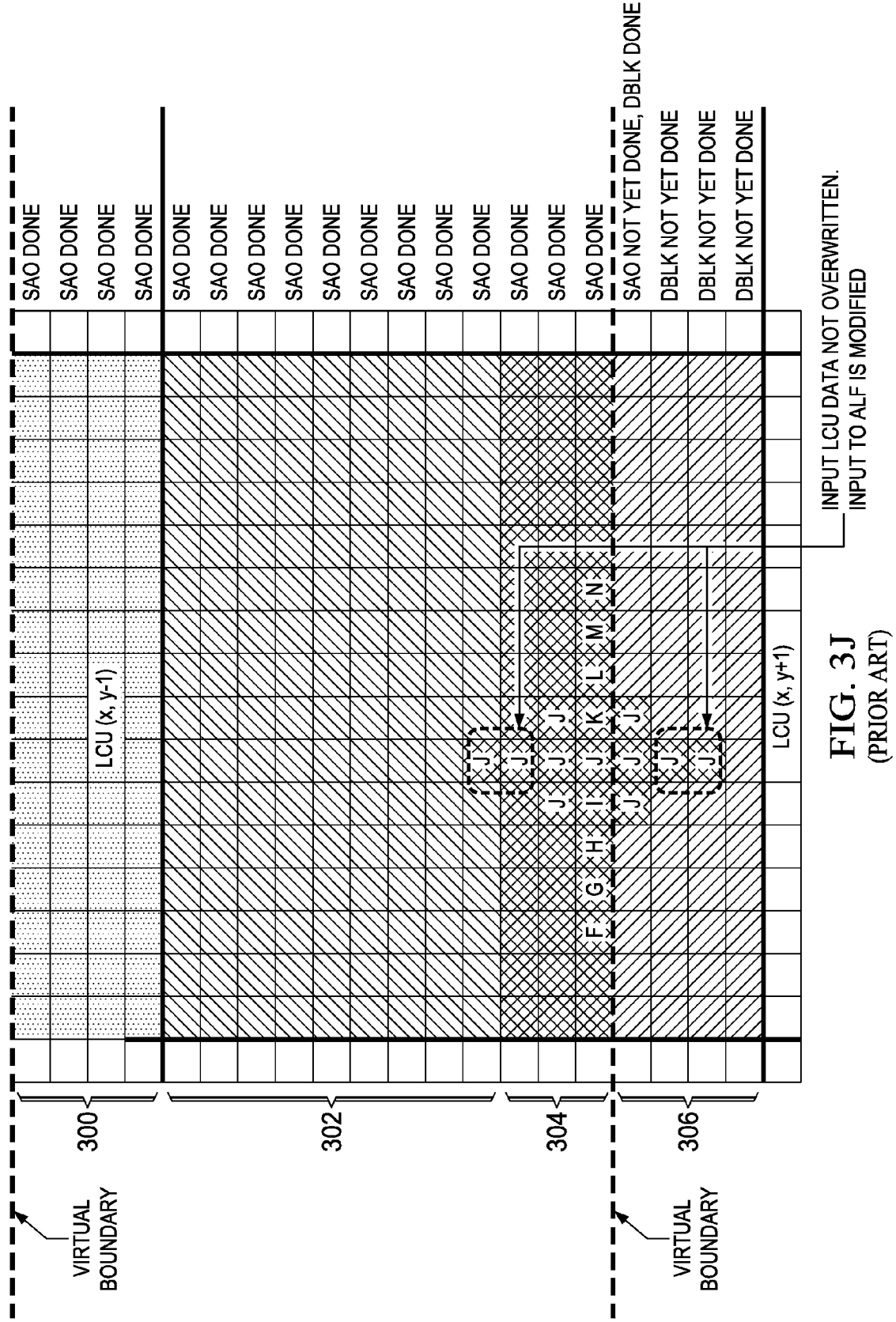

FIGS. 3H-3J illustrate application of the ALF filter to the pixels of region 304, i.e., the three bottom rows of pixels within the virtual boundaries that are in the current LCU (x, y) and immediately above the lower virtual boundary (VB). As the pixels in region 304 are from the current LCU(x, y), the coefficients of the filter selected for this LCU are used to filter pixels in this region. The filtering of the pixels in this region requires pixels from rows in region 306. The pixels in region 306 have not yet been deblocked and SAO filtered, and thus are not available.

FIG. 3H illustrates the computation of output filtered pixel values for the top row of region 304. As shown in FIG. 3H, to filter each pixel in this row, a pixel value is needed from the top row of region 306. As this pixel value is unavailable, a padded value is substituted. In particular, the value of the center pixel J is replicated as the value of the unavailable pixel. Further, to preserve the symmetry of the filtering, the value of the center pixel J also replaces the corresponding pixel value needed from the corresponding row above the top row. Thus, the filter output value for a pixel J in the top row of region 304 (assuming all pixels to the right and left of J are available) is computed as: Output=C0*(J+J)+C1*(B+R)+C2*(C+Q)+C3*(D+P)+C4*(E+O)+C5*(F+N)+C6*(G+M)+C7*(H+L)+C8*(I+K)+C9*J.

FIG. 3I illustrates the computation of output filtered pixel values for the second row of region 304. As shown in FIG. 3I, to filter each pixel in this row, pixel values are needed from the top two rows of region 306. As these pixel values are unavailable, a padded value is substituted. In particular, the value of the center pixel J is replicated as the value of the unavailable pixels. Further, to preserve the symmetry of the filtering, the value of the center pixel J also replaces the corresponding pixel values needed from the corresponding two rows above the second row. Thus, the filter output value for a pixel J in the second row of region 304 (assuming all pixels to the right and left of J are available) is computed as: Output=C0*(J+J)+C1*(J+J)+C2*(C+Q)+C3*(D+P)+C4*(E+O)+C5*(F+N)+C6*(G+M)+C7*(H+L)+C8*(I+K)+C9*J.

FIG. 3J illustrates the computation of output filtered pixel values for the bottom row of region 304. As shown in FIG. 3J, to filter each pixel in this row, pixel values are needed from the top three rows of region 306. As these pixel values are unavailable, a padded value is substituted. In particular, the value of the center pixel J is replicated as the value of the unavailable pixels. Further, to preserve the symmetry of the filtering, the value of the center pixel J also replaces the corresponding pixel values needed from the corresponding three rows above the bottom row. Thus, the filter output value for a pixel J in the bottom row of region 304 (assuming all pixels to the right and left of J are available) is computed as: Output=C0*(J+J)+C1*(J+J)+C2*(J+J)+C3*(J+J)+C4*(J+J)+C5*(F+N)+C6*(G+M)+C7*(H+L)+C8*(I+K)+C9*J.

Embodiments of the invention provide alternative padding techniques for virtual boundary processing in ALF that allow the use of more actual pixel values than in the prior art, i.e., rather than using just the value of the center pixel for padding, more available pixel values are used. Hardware architectures are also provided for ALF with virtual boundary processing. In one embodiment, an example hardware architecture is provided for filtering with the prior art boundary processing technique. In one embodiment, an example hardware architecture is provided for filtering with the alternative padding techniques.

Figure 4:
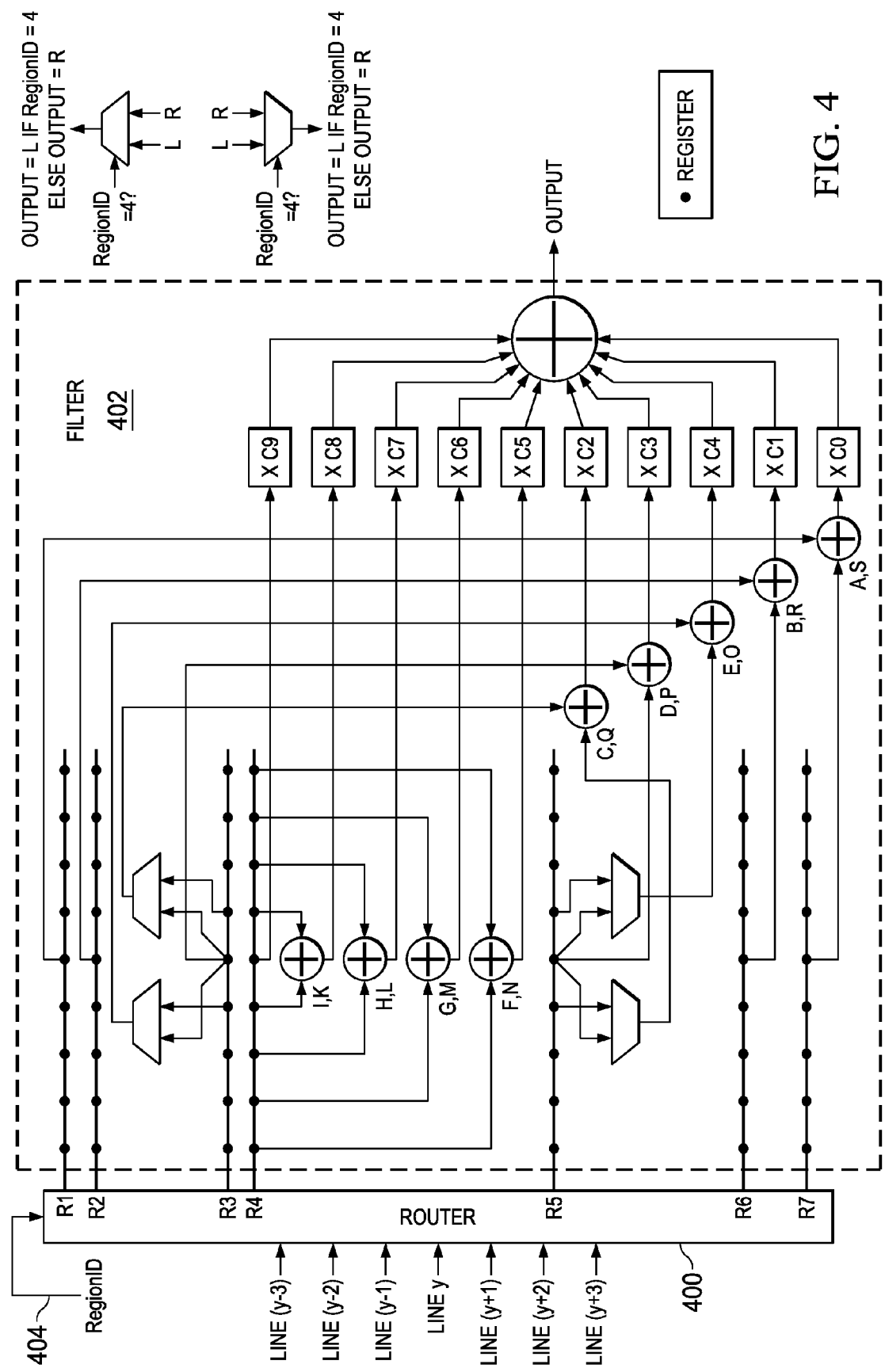
FIG. 4 is a block diagram of an example hardware architecture for ALF using the prior art virtual boundary processing.

FIG. 4 is a block diagram of a hardware architecture implementing the above prior art ALF filtering using virtual boundaries. This hardware architecture includes a router 400 connected to an symmetric 2D FIR filter circuit 402 configured to perform computations of the filter of FIG. 1, i.e., Output=C0*(A+S)+C1*(B+R)+C2*(C+Q)+C3*(D+P)+C4*(E+O)+C5*(F+N)+C6*(G+M)+C7*(H+L)+C8*(I+K)+C9*J. As is explained in more detail below, the filter 402 is augmented with four multiplexors to a reconstructed largest coding unit (LCU) handle certain special conditions of the virtual boundary processing. The router 400 includes outputs R1-R7, each of which is connected to one of seven multi-bit shift registers in the filter 402, each having nine multi-bit registers. The number of multi-bit shift registers and the number of multi-bit registers in each multi-bit shift register is determined based on the vertical and horizontal dimensions of the symmetric filter. Thus, for the filter shape of FIG. 1, there is one multi-bit shift register for each row (line) of pixels in the filter and each multi-bit shift register includes one multi-bit register for each column of pixels in the filter shape. The router 400 has seven inputs, the contents of which the router 400 sends to the outputs R1-R7, and thus to the corresponding shift registers, based on a region identifier control 404 (RegionID). The router 400 may be implemented, for example, as a crossbar switch with mapping circuitry to map the region identifier to appropriate switch settings or a series of multiplexors with mapping (control) circuitry to map the region identifier to the appropriate control signals for the multiplexors.

The seven inputs of the router 400 are supplied from seven consecutive lines (rows) of pixels within the virtual boundaries of the LCU being filtered. Table 1 shows the values of the RegionID, the description of the region corresponding to each RegionID value, and which input line is directed by the router 400 to which output line R1-R7 for each RegionID value. In FIG. 4 and Table 1, y denotes the y coordinate of the current pixel being filtered, e.g., the y coordinate of pixel J in the example of FIGS. 3A-3J. Referring to the notation of FIG. 2, the register set R1 corresponds to pixel value A, the register set R2 corresponds to pixel value B, the register set R3 corresponds to pixel values C, D, and E, the register set R4 corresponds to pixel values F-N, the register set R5 corresponds to pixel values O, P, and Q, the register set R6 corresponds to the pixel value R, and the register set R7 corresponds to the pixel value S.

The regions in Table 1 are defined such that the router 400 (responsive to the supplied RegionID) directs the value of J, i.e., line y, to the appropriate multi-bit shift registers as needed to supply the padded values for most of the filter computations. However, multiplexors are needed for the multi-bit shift registers R3 (values C, D, E) and R5 (values O, P, Q) for RegionID=4 as the pixels values for positions C and E and positions O and Q will be actual pixel values from line y (see Table 1). As per FIGS. 3B and 3J (which correspond to RegionID=4), these positions should be padded with the value of the pixel at position J. Accordingly, four multiplexors, two connected to the three center multi-bit registers in the multi-bit shift register R3 and two connected to the three center multi-bit registers in the multi-bit shift register R5, are added to the filter 402.

For the multi-bit shift register R3, the left input to each multiplexor is the register corresponding to pixel position D, which will have the value of pixel position J when RegionID=4. The right input to the left multiplexor is the value of the pixel at position C for RegionID=1, 2, 3 and is the value of the pixel in line y immediately to the left of the pixel currently being filtered when RegionID=4. The right input to the right multiplexor is the value of the pixel at position E for RegionID=1, 2, 3 and is the value of the pixel in line y immediately to right of the pixel currently being filtered when RegionID=4. When RegionID=4, these multiplexors select the left inputs as outputs; otherwise, the right inputs are selected as outputs.

For the register set R5, the left input to each multiplexor is the register corresponding to pixel position P, which will have the value of pixel position J when RegionID=4. The right input to the left multiplexor is the value of the pixel at position O for RegionID=1, 2, 3 and is the value of the pixel in line y immediately to the left of the pixel currently being filtered when RegionID=4. The right input to the right multiplexor is the value of the pixel at position Q for RegionID=1, 2, 3 and is the value of the pixel in line y immediately to right of the pixel currently being filtered when RegionID=4. When RegionID=4, these multiplexors select the left inputs as outputs; otherwise, the right inputs are selected as outputs.

Pairs of registers are connected to adders to perform the additions of the pixel values at symmetric positions in the filter shape. Each adder is connected to a multiplier that multiplies the adder output with the coefficient value for the symmetric positions. An additional multiplier is connected to the center register of the multi-bit shift register R4, which holds the pixel value J. This multiplier multiplies the pixel value by the center coefficient value (C9) of the filter shape. The multipliers are connected to a multi-input adder that adds the outputs of the multipliers to produce a filtered pixel value.

In general, the multi-bit shift registers operate a sliding window across seven rows of pixels between the virtual boundaries. After each filter computation, the window moves to the right by one pixel, i.e., the contents of the multi-bit registers of each multi-bit shift register are shifted to the right by one register, and a new pixel value is read into the leftmost register of each multi-bit shift register according to the value of the RegionID.

TABLE 1

| Region Description | RegionID | R1 | R2 | R3 | R4 | R5 | R6 | R7 |
|---|---|---|---|---|---|---|---|---|
| Region 302 and Line 4 of region 300 | 1 | y − 3 | y − 2 | y − 1 | y | y + 1 | y + 2 | y + 3 |
| Line 3 of region 300 and Line 1 of region 304 | 2 |  | y | y − 2 | y − 1 | y | y + 1 | y + 2 | y |
| Line 2 of region 300 and Line 2 of region 304 | 3 |  | y | y | y − 1 | y | y + 1 | y | y |
| Line 1 of region 300 and Line 3 of region 304 | 4 |  | y | y | y | y | y | y | y |

Figure 5A:
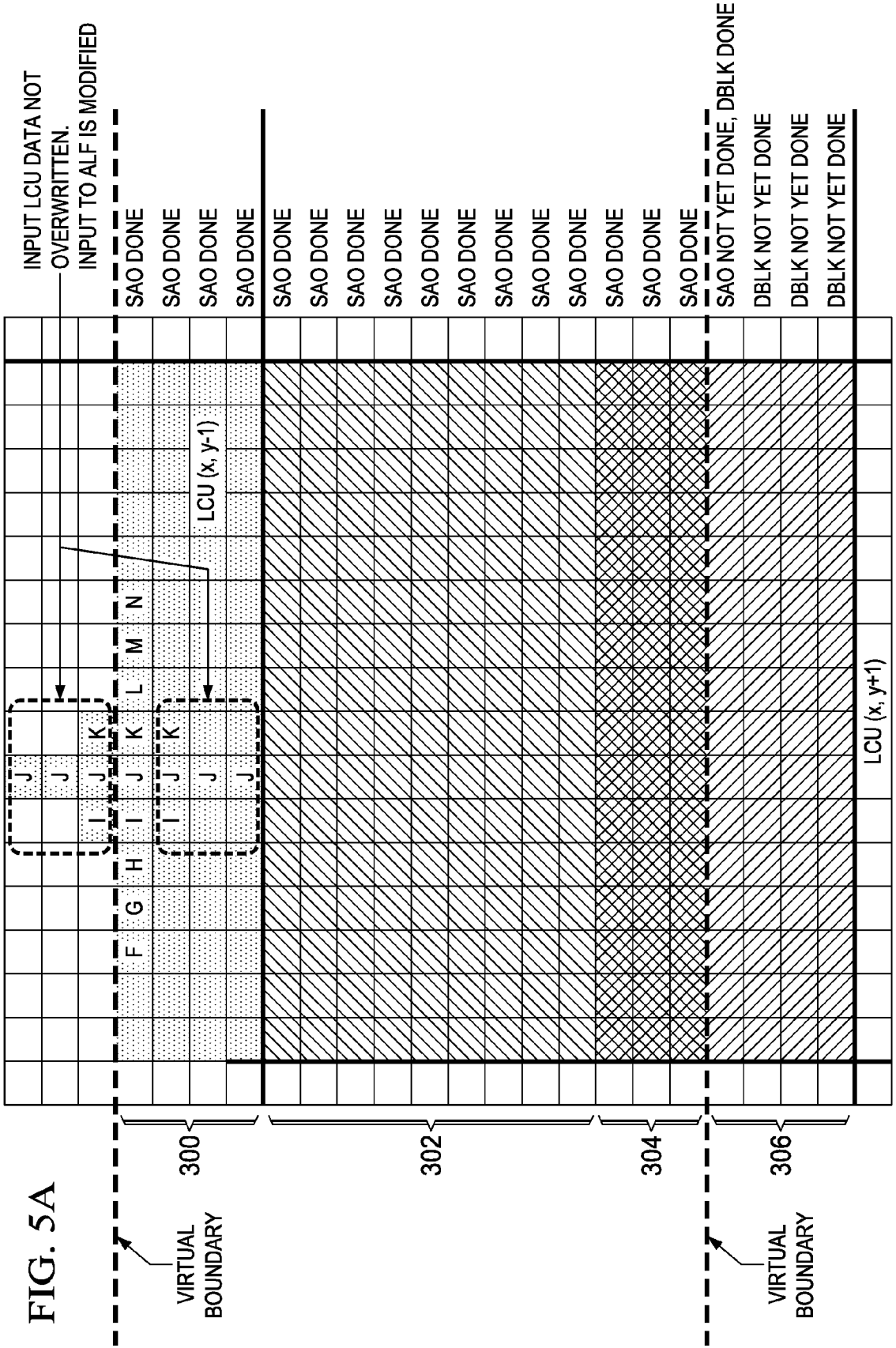

FIGS. 5A-5I are an example illustrating an embodiment of one such alternative padding technique. In this technique, rather than using the value of the pixel at position J as the padding value for all unavailable pixel positions and the corresponding symmetric pixel positions, the available pixel values at other available pixel positions are used for corresponding unavailable symmetric positions. FIG. 5A illustrates the computation of output filtered pixel values for the top row of region 300. As previously discussed, the pixels in region 300 are from the top neighboring LCU(x, y−1), so the coefficients of the filter selected for that LCU are used to filter pixels in this region. As shown in FIG. 5A, to filter pixels in this row, pixel values are needed from the three rows above this row in LCU(x, y−1), i.e., from the unavailable three rows above the top virtual boundary (VB).

Rather than substituting the value of the pixel at position J for all of the unavailable pixels and their corresponding symmetric pixel positions as in the prior art, the value of the pixel at the center position J is replicated for the unavailable pixel positions and their corresponding symmetric pixel positions in the same column as position J. For the other unavailable pixel positions, i.e., pixel positions C and E, the values of the pixels to the immediate left and right of the center position J are replicated for the unavailable pixel values in the same column and their corresponding symmetric pixel position. That is, the value of the pixel at position I is replicated as the value of the unavailable pixel at position C and the value of the pixel in the corresponding pixel position O. Similarly, the value of the pixel at position K is replicated as the value of the unavailable pixel at position E and the value of the pixel in the corresponding pixel position Q. Thus, the filter output value for a pixel J in the top row of region 300 (assuming all pixels to the right and left of J are available) is computed as: Output=C0*(J+J)+C1*(J+J)+C2*(I+K)+C3*(J+J)+C4*(I+K)+C5*(F+N)+C6*(G+M)+C7*(H+L)+C8*(I+K)+C9*J.

Figure 5C:
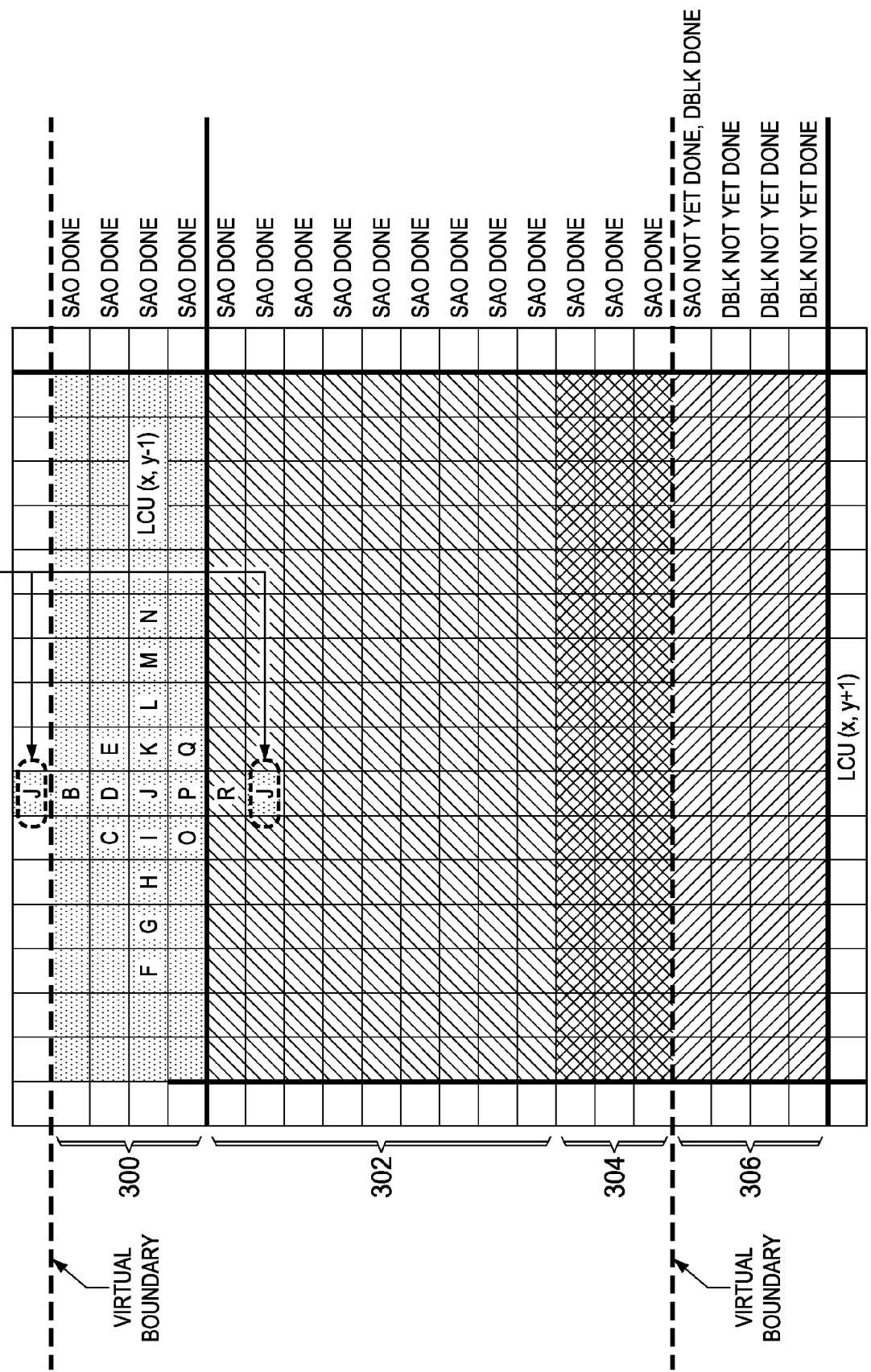
Figure 5D:
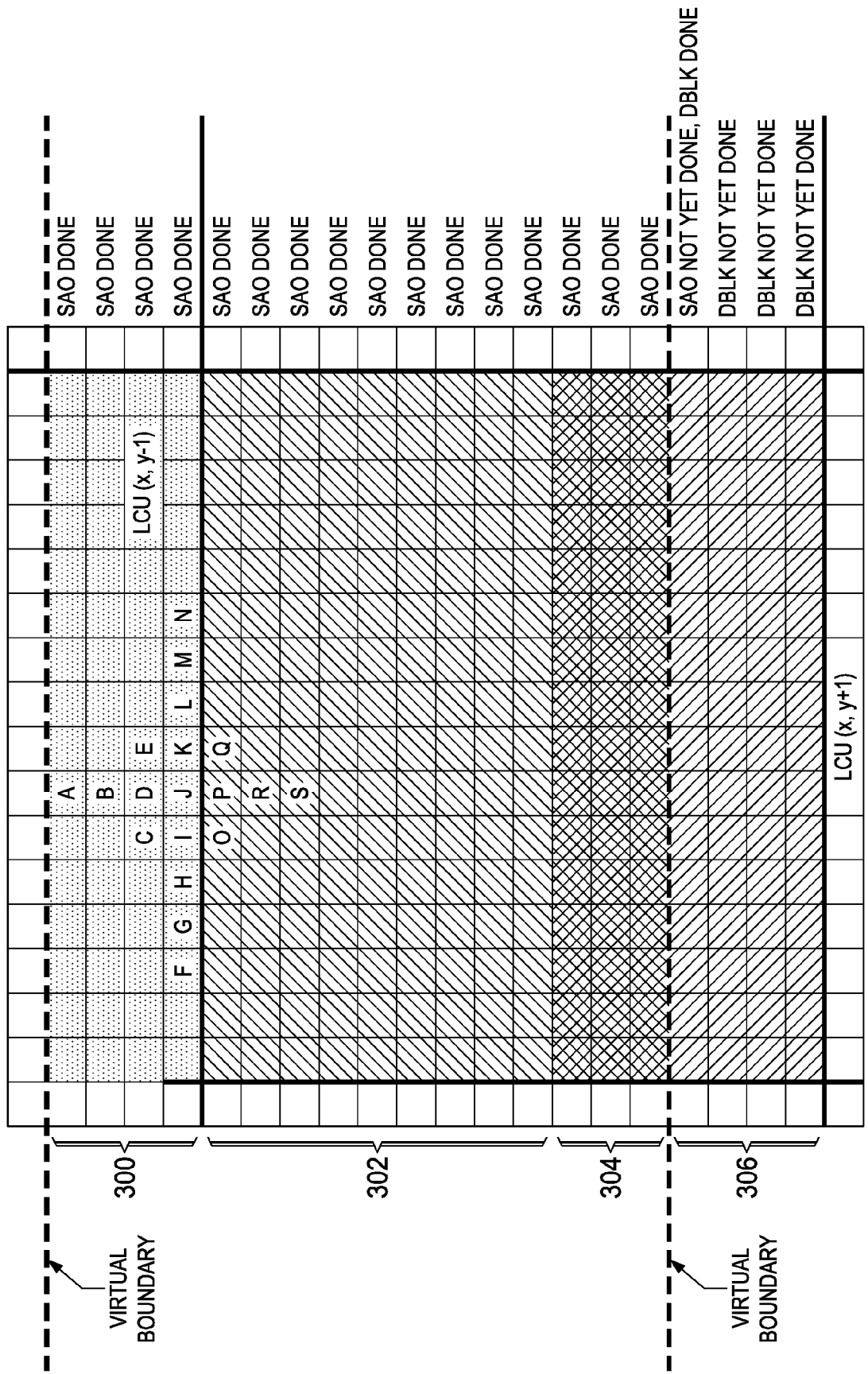
Figure 5F:
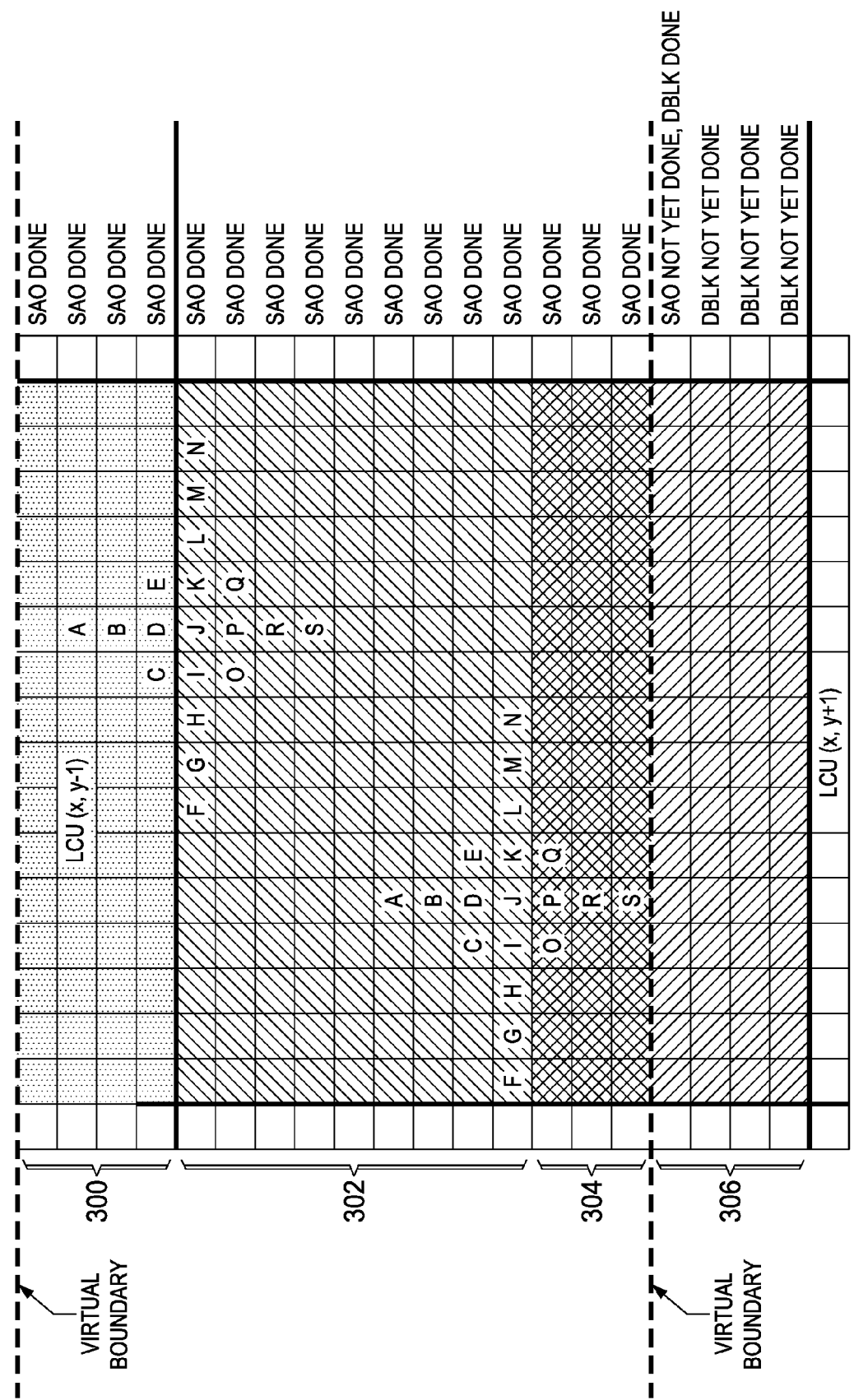

FIGS. 5B-5D illustrate application of the ALF filter to, respectively, the second, third, and fourth rows of region 300. This processing is identical to that described in reference to FIGS. 3C-3E. FIGS. 5E and 5F illustrate application of the ALF filter to the pixels of region 302. This region includes rows of pixels within the virtual boundaries that are from the current LCU (x, y). Thus, the coefficients of the filter selected for the current LCU (x, y) are used to filter pixels in this region. This processing is identical to that described in reference to FIGS. 3F and 3G.

Figure 5G:
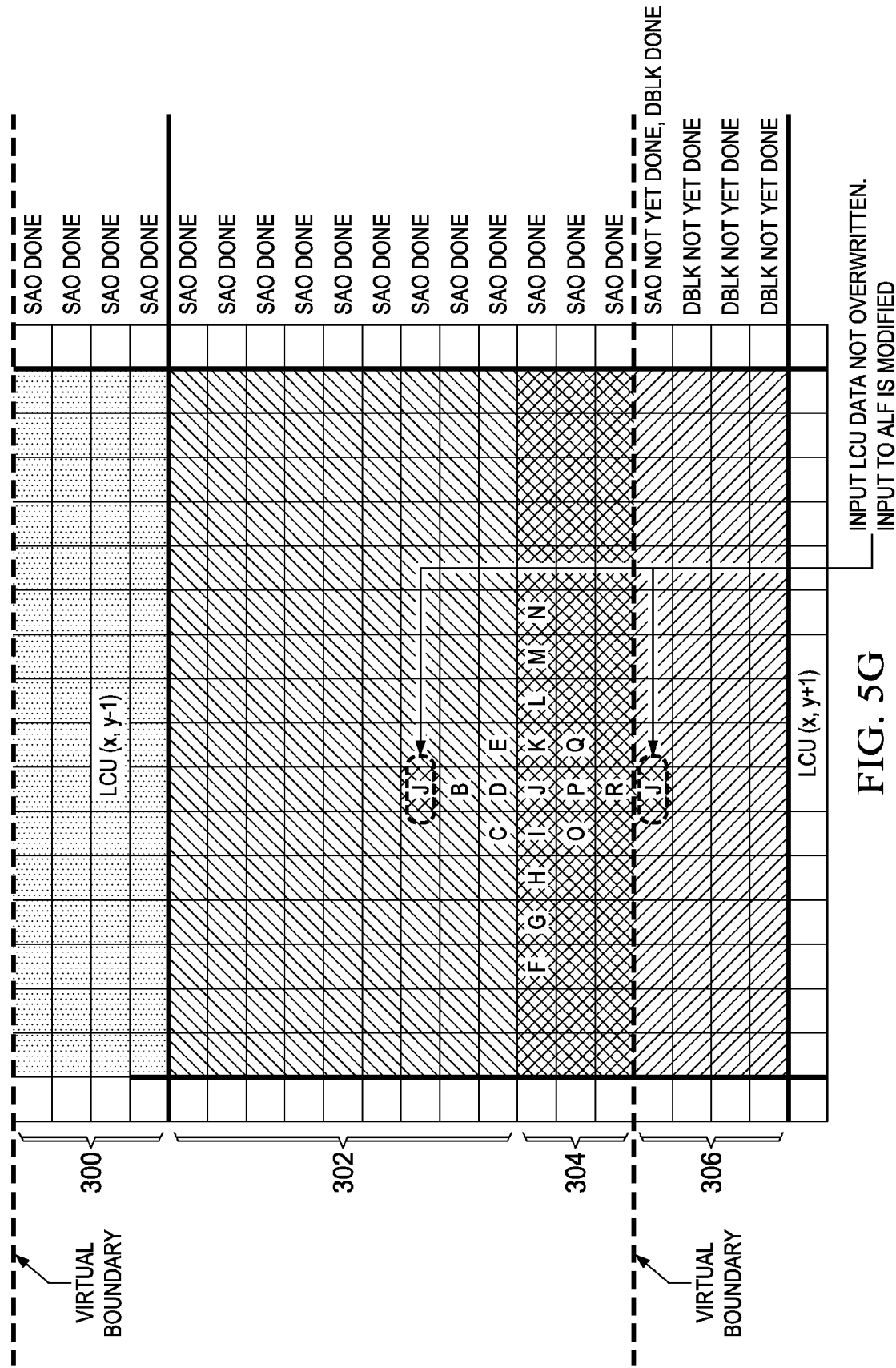
Figure 5H:
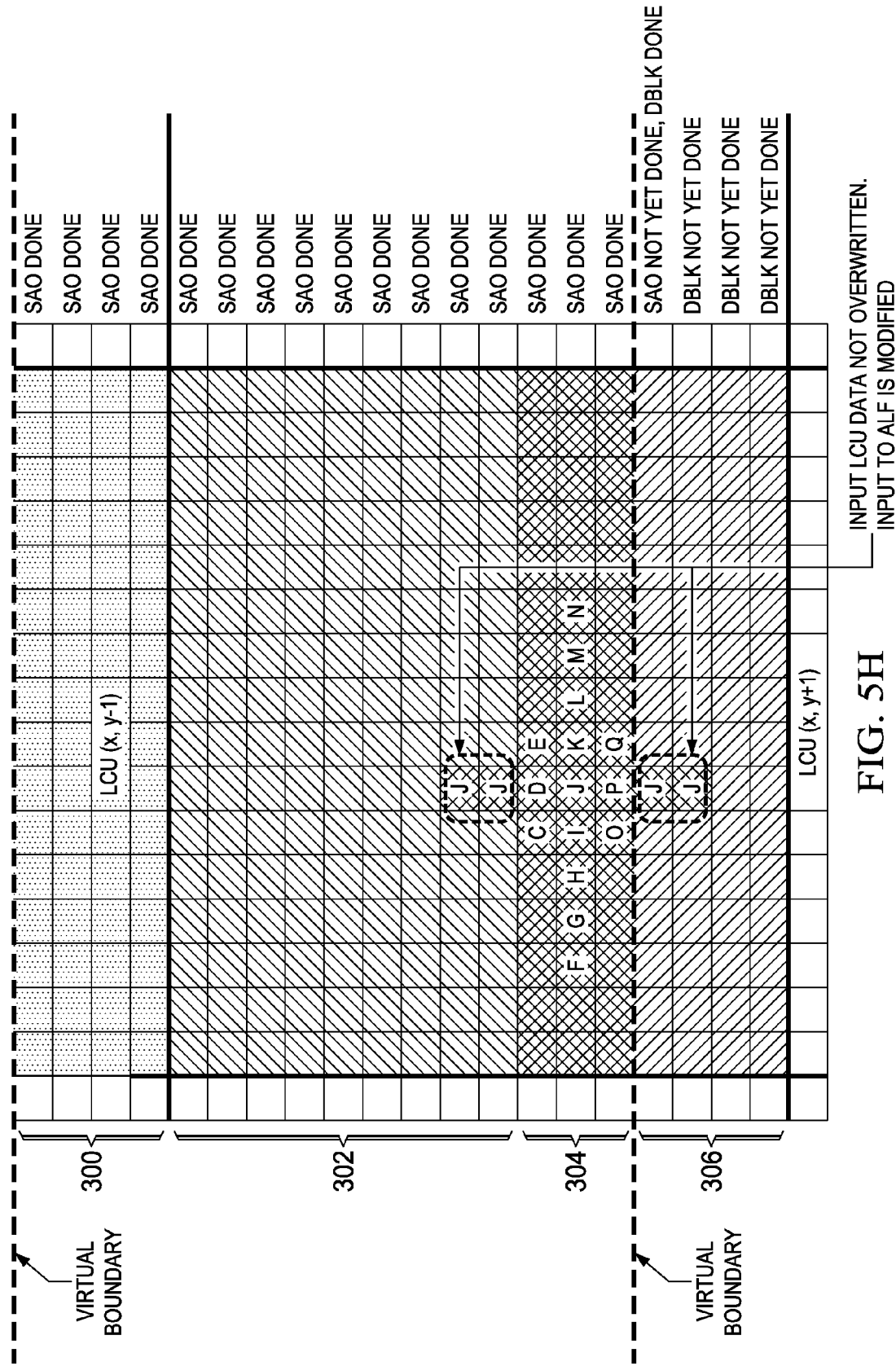
Figure 5I:
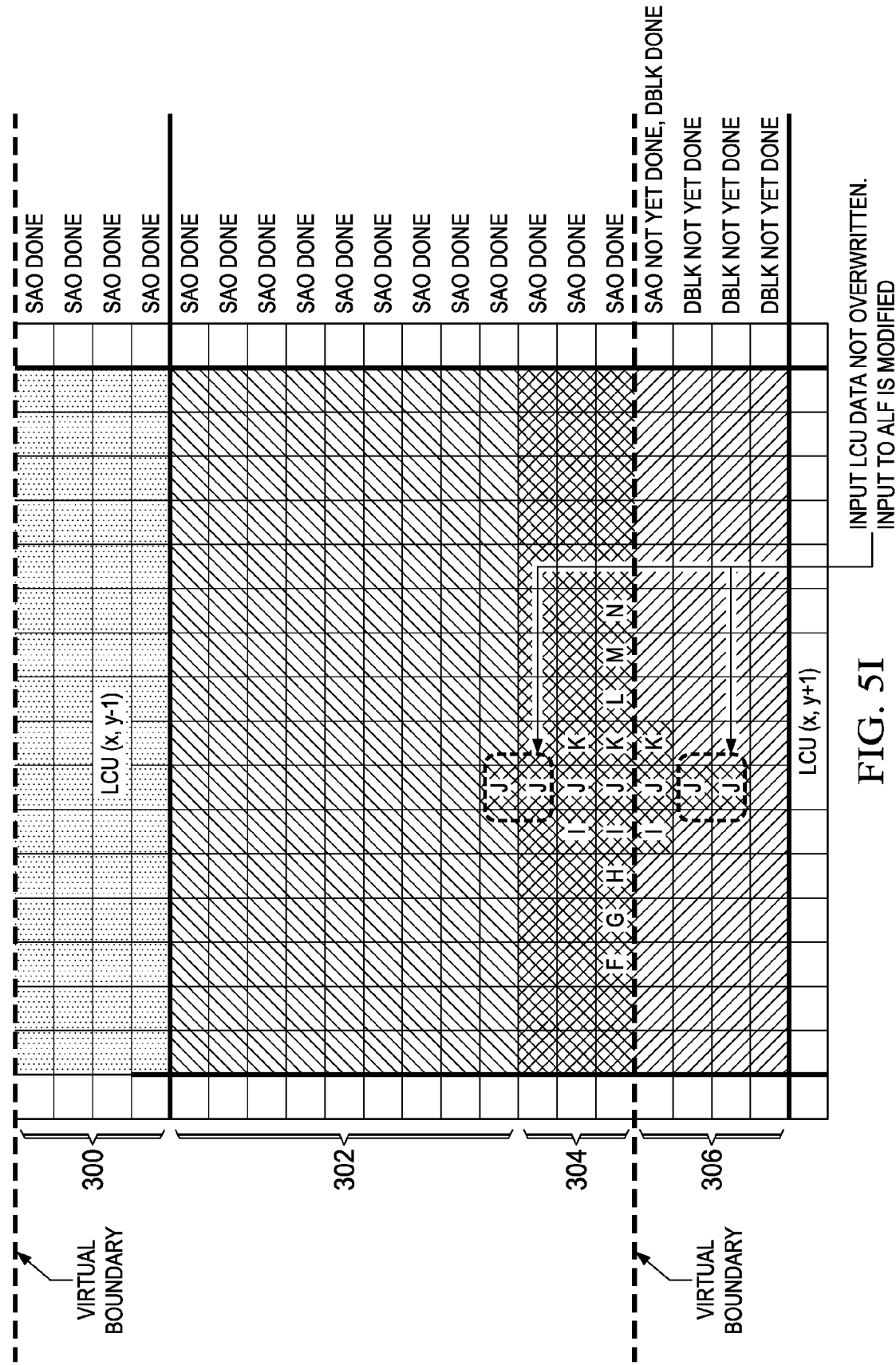

FIGS. 5G-5I illustrate application of the ALF filter to the pixels of region 304, i.e., the three bottom rows of pixels within the virtual boundaries that are in the current LCU (x, y) and immediately above the lower virtual boundary (VB). As the pixels in region 304 are from the current LCU(x, y), the coefficients of the filter selected for this LCU are used to filter pixels in this region. As previously discussed, the filtering of the pixels in this region requires pixels from unavailable rows in region 306. FIGS. 5G and 5H respectively illustrate the computation of output filtered pixel value for the top and middle rows of region 304. This processing is identical to that described in reference to FIGS. 3H and 3I.

FIG. 5I illustrates the computation of output filtered pixel values for the bottom row of region 304. Rather than substituting the value of the pixel at position J for all of the unavailable pixels and their corresponding symmetric pixel positions as in the prior art, the value of the pixel at the center position J is replicated for the unavailable pixel positions and their corresponding symmetric pixel positions in the same column as position J. For the other unavailable pixel positions, i.e., pixel positions O and Q, the values of the pixels to the immediate left and right of the center position J are replicated for the unavailable pixel values in the same column and their corresponding symmetric pixel position. That is, the value of the pixel at position I is replicated as the value of the unavailable pixel at position O and the value of the pixel in the corresponding pixel position C. Similarly, the value of the pixel at position K is replicated as the value of the unavailable pixel at position Q and the value of the pixel in the corresponding pixel position E. Thus, the filter output value for a pixel J in the top row of region 300 (assuming all pixels to the right and left of J are available) is computed as: Output=C0*(J+J)+C1*(J+J)+C2*(I+K)+C3*(J+J)+C4*(I+K)+C5*(F+N)+C6*(G+M)+C7*(H+L)+C8*(I+K)+C9*J.

FIGS. 6A-6I are an example illustrating an embodiment of another such alternative padding technique. In this technique, similar to that of FIGS. 5A-5I, rather than using the value of the pixel at position J as the padding value for all unavailable pixel positions and the corresponding symmetric pixel positions, the available pixel values at other available pixel positions are used for corresponding unavailable symmetric positions. More specifically, the value of the pixel at position J is not used for padding for any unavailable pixel position and the corresponding symmetric pixel positions. Instead, the pixel values of available pixel positions are replicated as pixel values for corresponding unavailable symmetric positions.

Figure 6A:
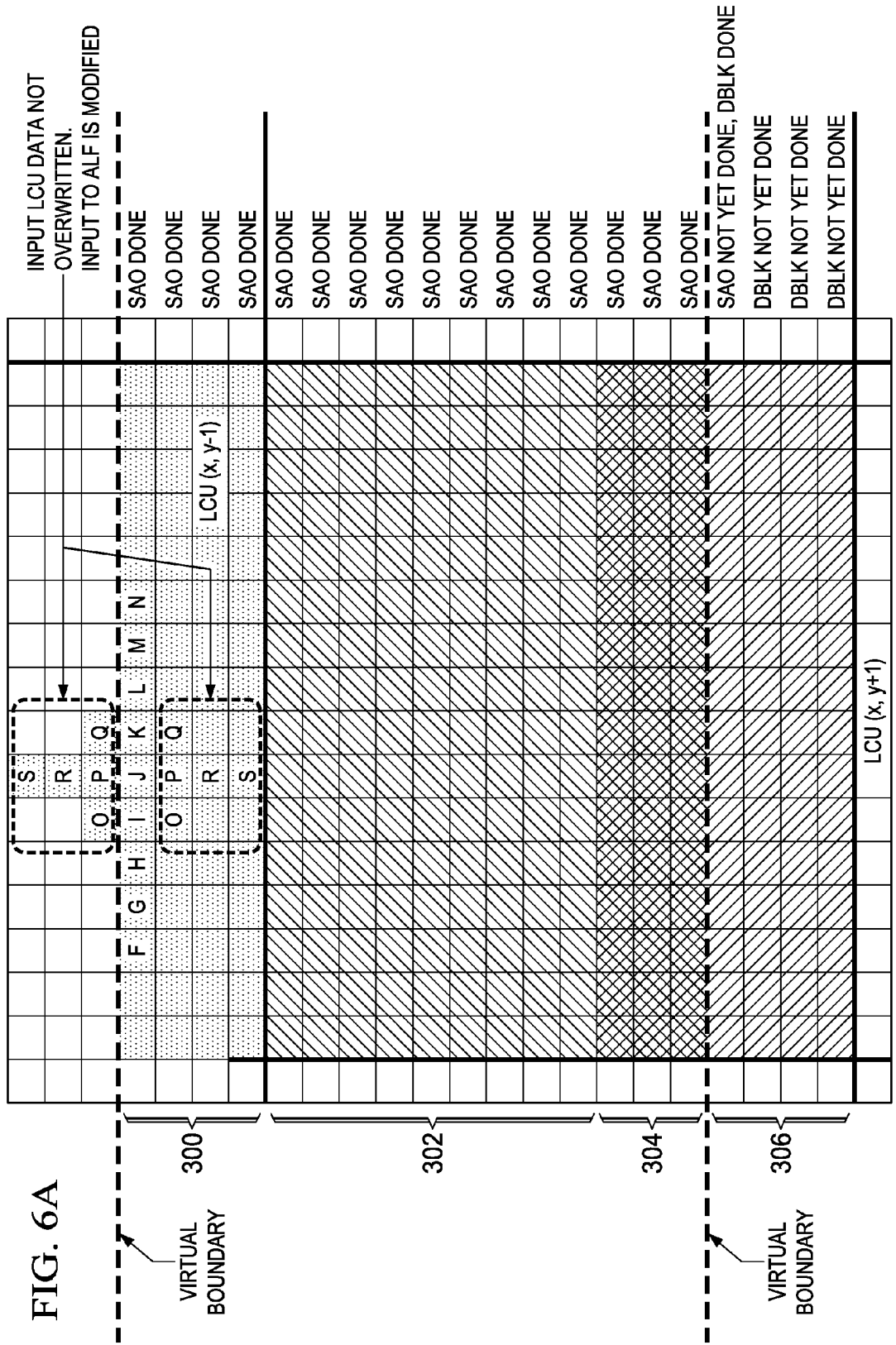

FIG. 6A illustrates the computation of output filtered pixel values for the top row of region 300. As previously discussed, the pixels in region 300 are from the top neighboring LCU(x, y−1), so the coefficients of the filter selected for that LCU are used to filter pixels in this region. As shown in FIG. 6A, to filter pixels in this row, pixel values are needed from the three rows above this row in LCU(x, y−1), i.e., from the unavailable three rows above the top virtual boundary (VB). Rather than substituting the value of the pixel at position J for all of the unavailable pixels and their corresponding symmetric pixel positions as in the prior art, the pixel values of available pixel positions are replicated for unavailable pixel values in corresponding symmetric pixel positions, i.e., the value of the available pixel at position P is replicated as the value of the unavailable pixel at position D, the value of the available pixel at position R is replicated as the value of the unavailable pixel at position B, the value of the available pixel at position S is replicated as the value of the unavailable pixel at position A, the value of the available pixel at position O is replicated as the value of the unavailable pixel at position C, and the value of the available pixel at position Q is replicated as the value of the unavailable pixel at position E. Thus, the filter output value for a pixel J in the top row of region 300 (assuming all pixels to the right and left of J are available) is computed as: Output=$C0*(S+S)+C1*(R+R)+C2*(Q+O)+C3*(P+P)+C4*(Q+O)+C5*(F+N)+C6*(G+M)+C7*(H+L)+C8*(I+K)+C9*J$.

Figure 6B:
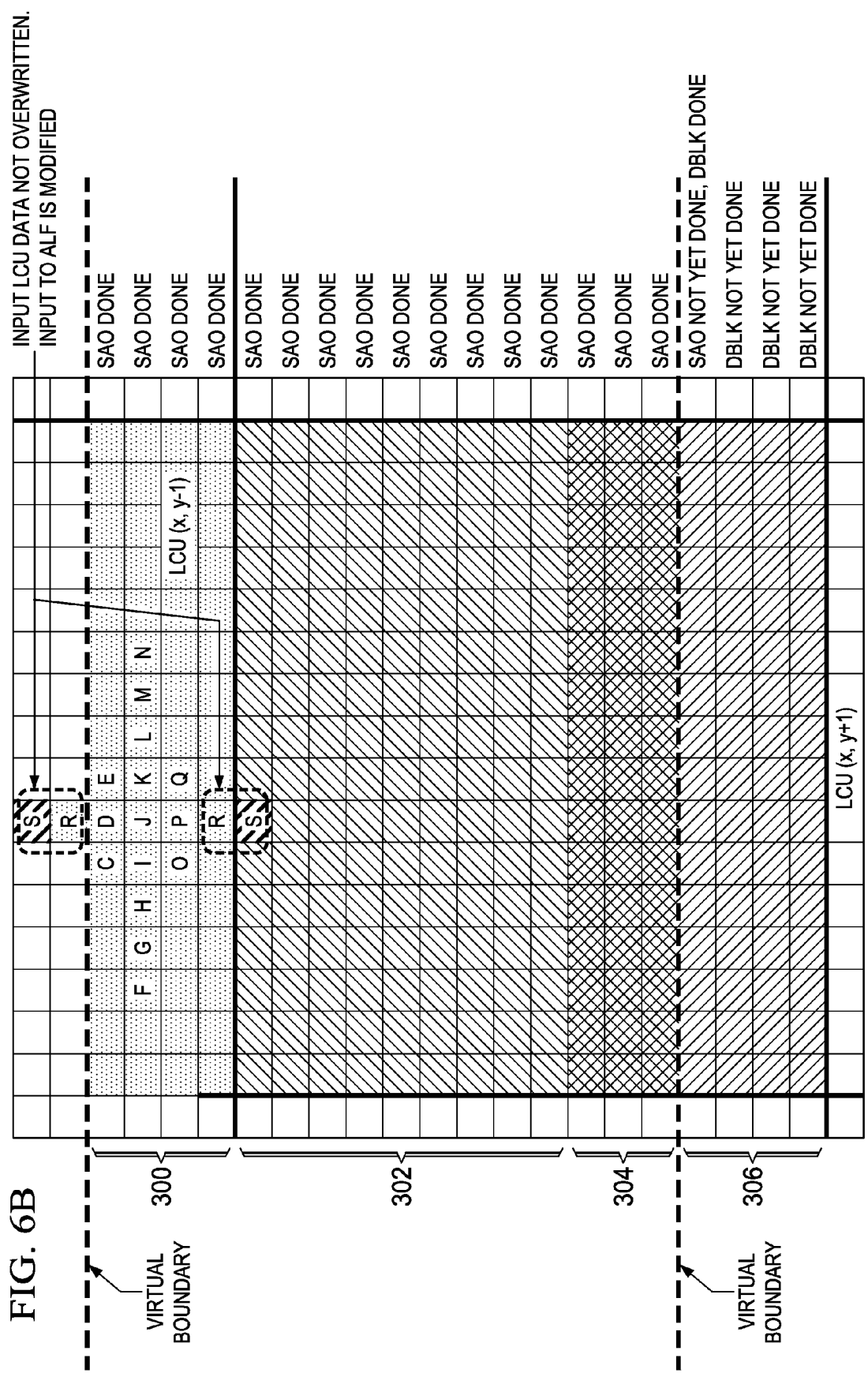

FIG. 6B illustrates the computation of output filtered pixel values for the second row of region 300. To filter pixels in this row, pixel values are needed from the unavailable two rows above the top virtual boundary. Rather than substituting the value of the pixel at position J for all of the unavailable pixels and their corresponding symmetric pixel positions as in the prior art, the pixel values of available pixel positions are replicated for unavailable pixel values in corresponding symmetric pixel positions, i.e., the value of the available pixel at position R is replicated as the value of the unavailable pixel at position B, and the value of the available pixel at position S is replicated as the value of the unavailable pixel at position A. Thus, the filter output value for a pixel J in the top row of region 300 (assuming all pixels to the right and left of J are available) is computed as: Output=$C0*(S+S)+C1*(R+R)+C2*(C+Q)+C3*(D+P)+C4*(E+O)+C5*(F+N)+C6*(G+M)+C7*(H+L)+C8*(I+K)+C9*J$.

FIG. 6C illustrates the computation of output filtered pixel values for the third row of region 300. To filter pixels in this row, pixel values are needed from one unavailable rows above the top virtual boundary. Rather than substituting the value of the pixel at position J for all of the unavailable pixels and their corresponding symmetric pixel positions as in the prior art, the pixel values of available pixel positions are replicated for unavailable pixel values in corresponding symmetric pixel positions, i.e., the value of the available pixel at position S is replicated as the value of the unavailable pixel at position A. Thus, the filter output value for a pixel J in the top row of region 300 (assuming all pixels to the right and left of J are available) is computed as: Output=$C0*(S+S)+C1*(B+R)+C2*(C+Q)+C3*(D+P)+C4*(E+O)+C5*(F+N)+C6*(G+M)+C7*(H+L)+C8*(I+K)+C9*J$.

Figure 6D:
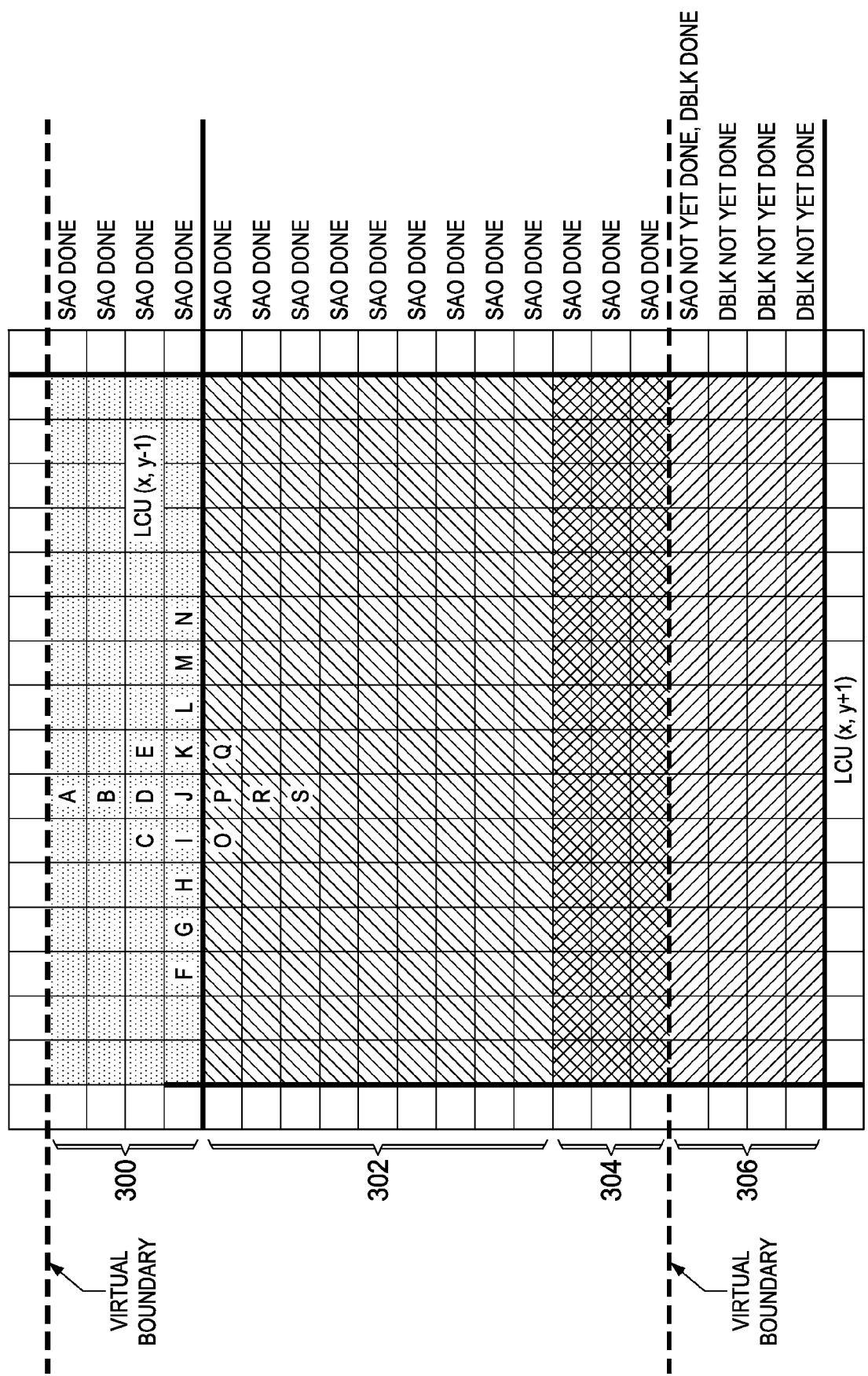

FIG. 6D illustrates the computation of output filtered pixel values for the fourth row of region 300. The pixel values from the rows above and below this row that are needed to filter the pixels in this row are available. Thus, no padding is needed and the filter output value for a pixel J in the fourth row of region 300 (assuming all pixels to the right and left of J are available) is computed as: $C0*(A+S)+C1*(B+R)+C2*(C+Q)+C3*(D+P)+C4*(E+O)+C5*(F+N)+C6*(G+M)+C7*(H+L)+C8*(I+K)+C9*J$.

Figure 6E:
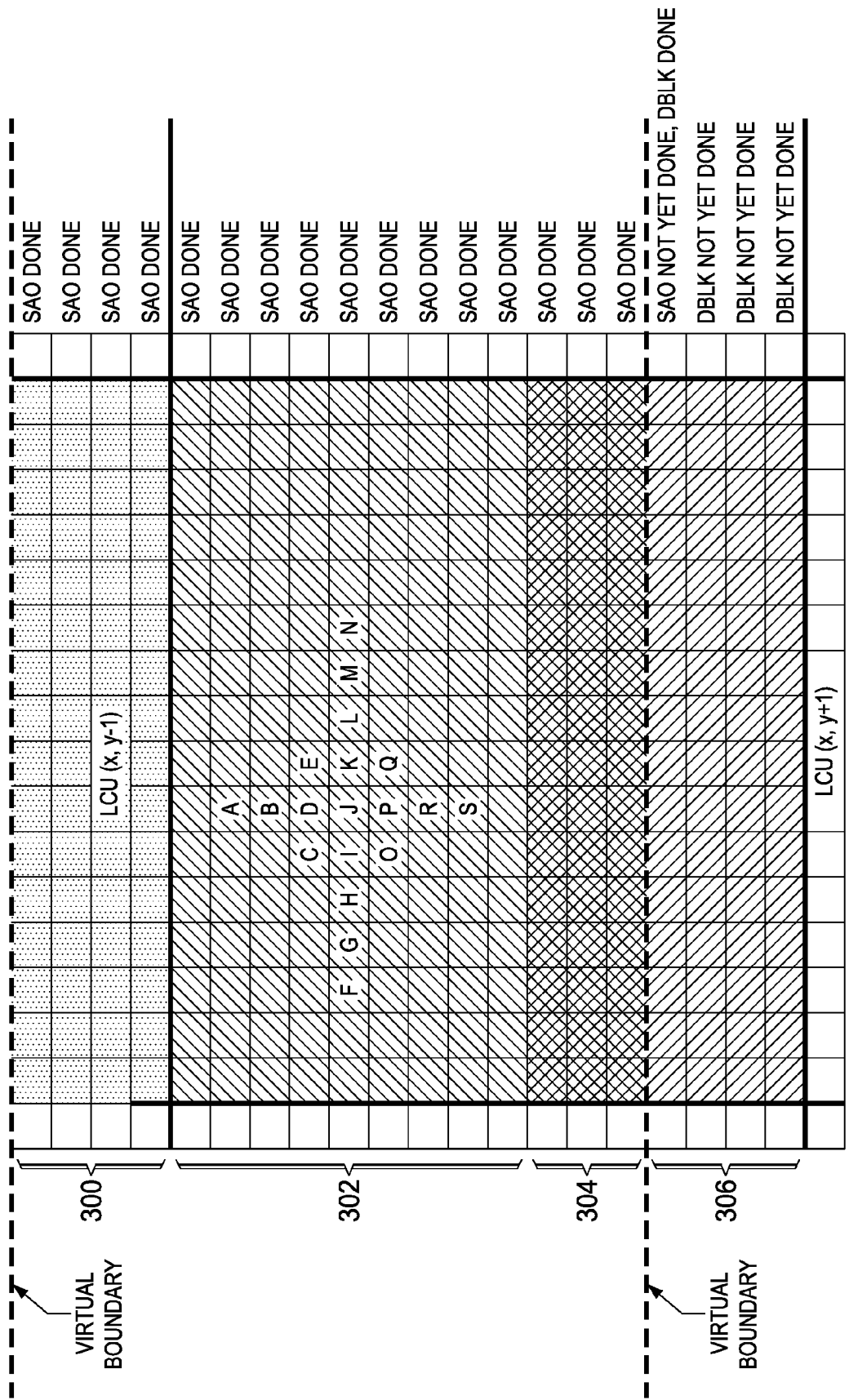
Figure 6F:
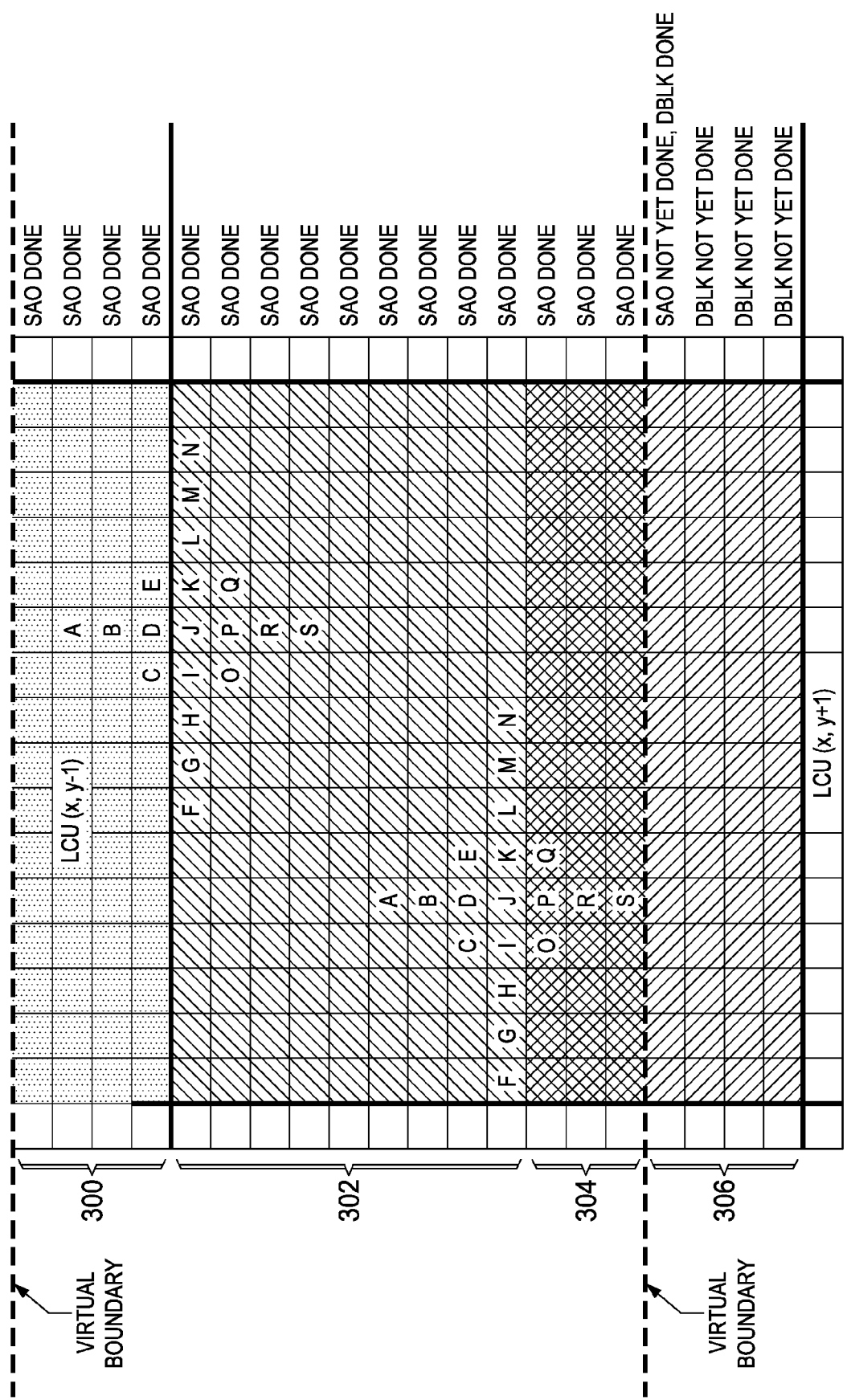

FIGS. 6E and 6F illustrate application of the ALF filter to the pixels of region 302. This region includes rows of pixels within the virtual boundaries that are from the current LCU (x, y). Thus, the coefficients of the filter selected for the current LCU (x, y) are used to filter pixels in this region. This processing is identical to that described in reference to FIGS. 3F and 3G.

Figure 6H:
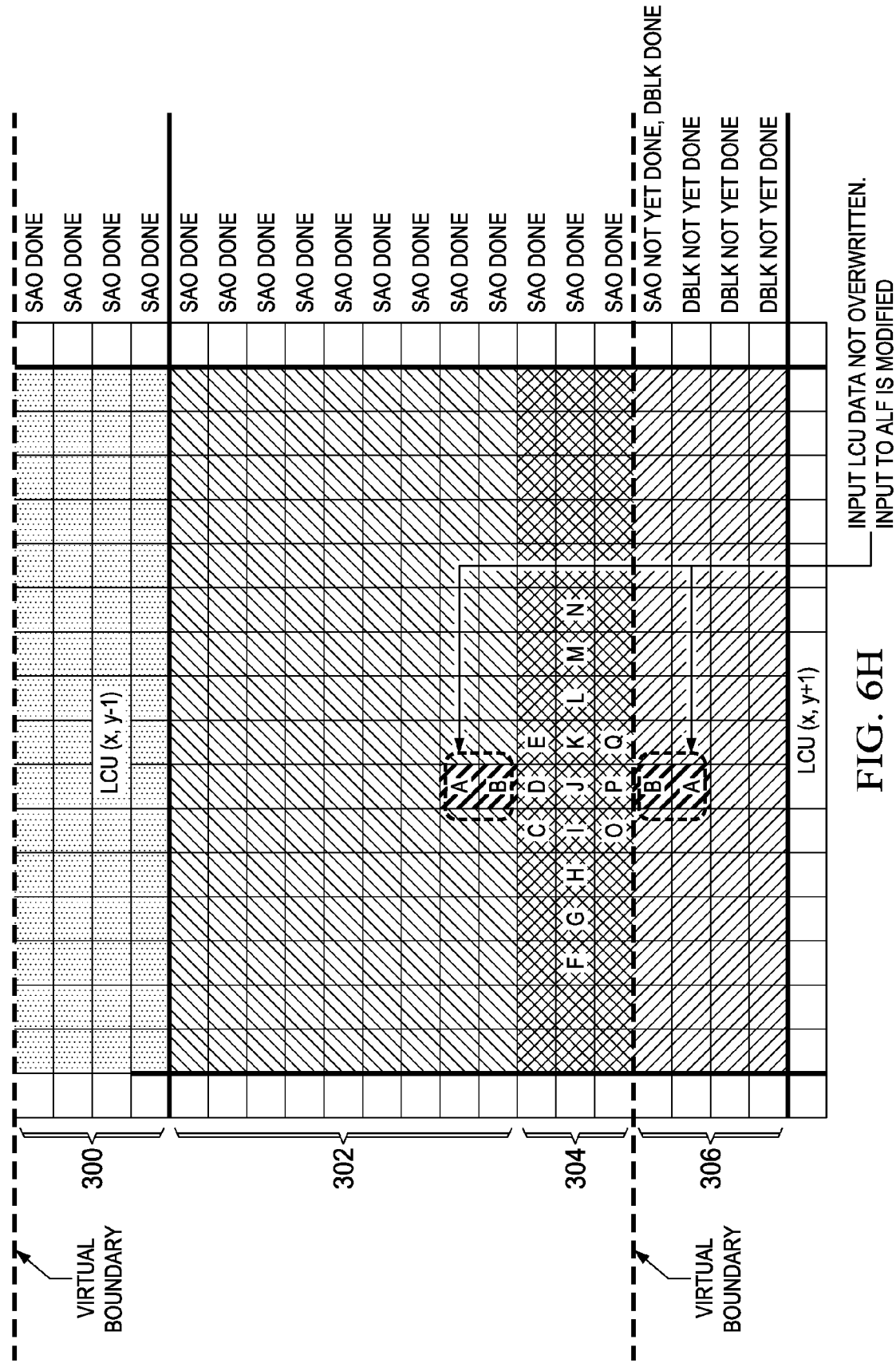
Figure 6I:
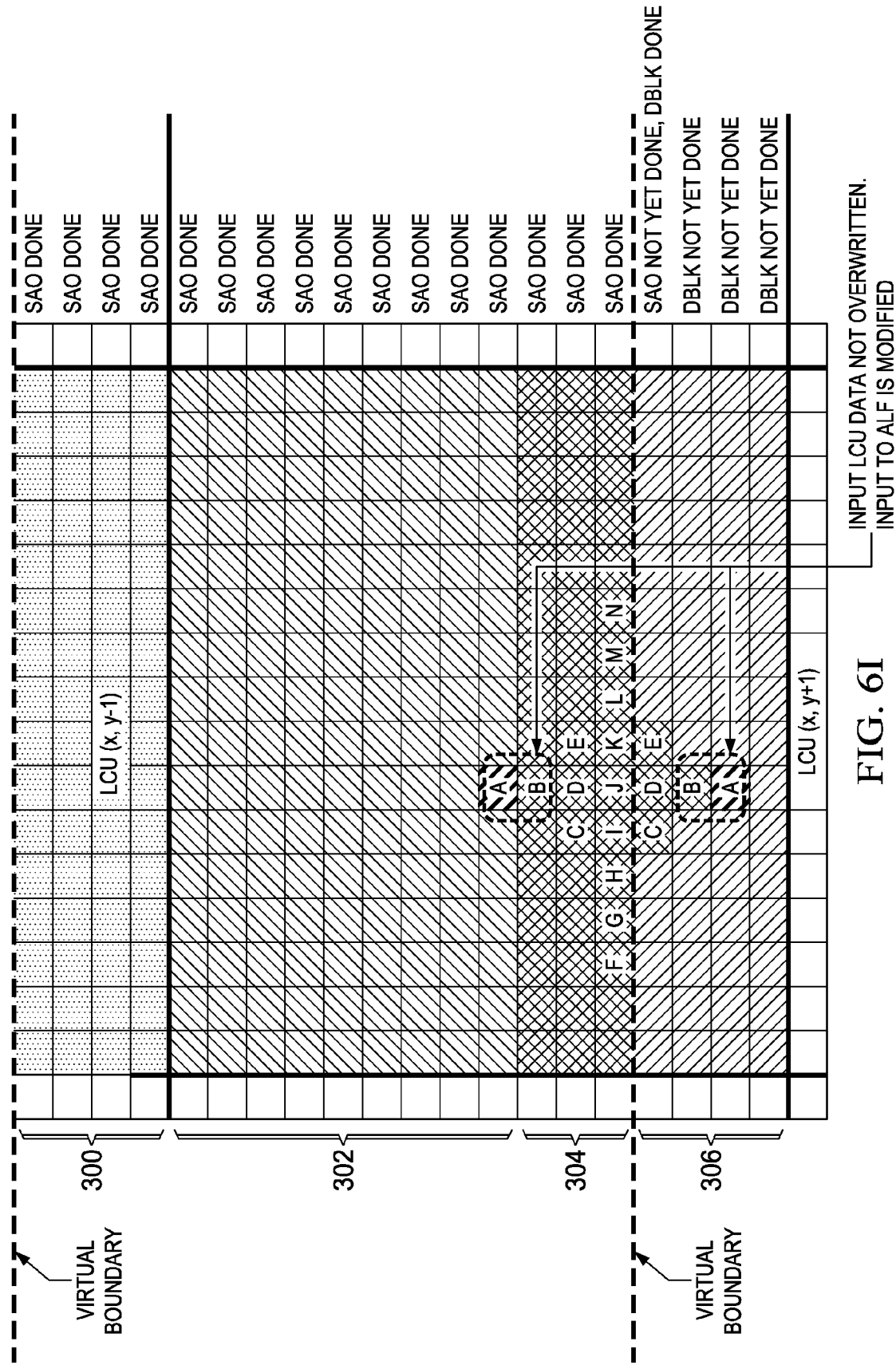

FIGS. 6G-6I illustrate application of the ALF filter to the pixels of region 304, i.e., the three bottom rows of pixels within the virtual boundaries that are in the current LCU (x, y) and immediately above the lower virtual boundary (VB). As the pixels in region 304 are from the current LCU(x, y), the coefficients of the filter selected for this LCU are used to filter pixels in this region. As previously discussed, he filtering of the pixels in this region requires pixels from unavailable rows in region 306.

FIG. 6G illustrates the computation of output filtered pixel values for the top row of region 304. As shown in FIG. 6G, to filter each pixel in this row, a pixel value for pixel position S is needed from the unavailable top row of region 306. As this pixel value is unavailable, a padded value is substituted. In particular, the value of the pixel at the available symmetric position A is replicated as the value of the pixel at the corresponding unavailable pixel position S. Thus, the filter output value for a pixel J in the top row of region 304 (assuming all pixels to the right and left of J are available) is computed as: Output=$C0*(A+A)+C1*(B+R)+C2*(C+Q)+C3*(D+P)+C4*(E+O)+C5*(F+N)+C6*(G+M)+C7*(H+L)+C8*(I+K)+C9*J$.

FIG. 6H illustrates the computation of output filtered pixel values for the second row of region 304. As shown in FIG. 6H, to filter each pixel in this row, pixel values are needed from the unavailable top two rows of region 306. As these pixel values are unavailable, padded values are substituted. In particular, the value of the pixel at the available position A is replicated as the value of the pixel at the corresponding symmetric unavailable pixel position S, and the value of the pixel at the available position B is replicated as the value of the pixel at the corresponding unavailable symmetric pixel position R. Thus, the filter output value for a pixel J in the second row of region 304 (assuming all pixels to the right and left of J are available) is computed as: Output=$C0*(A+A)+C1*(B+B)+C2*(C+Q)+C3*(D+P)+C4*(E+O)+C5*(F+N)+C6*(G+M)+C7*(H+L)+C8*(I+K)+C9*J$.

FIG. 6I illustrates the computation of output filtered pixel values for the bottom row of region 304. As shown in FIG. 6I, to filter each pixel in this row, pixel values are needed from the unavailable top three rows of region 306. As these pixel values are unavailable, padded values are substituted. In particular, the value of the pixel at the available pixel position A is substituted for the value of the pixel at the corresponding unavailable symmetric pixel position S, the value of the pixel at the available position B is substituted for the value of the pixel at the corresponding unavailable pixel position R, the value of the pixel at the available pixel position D is substituted for the value of the pixel at the corresponding unavailable pixel position P, the value of the pixel at the available position C is substituted for the value of the pixel at the corresponding unavailable pixel position O, and the value of the pixel at the available position E is substituted for the value of the pixel at the corresponding unavailable pixel position Q. Thus, the filter output value for a pixel J in the bottom row of region 304 (assuming all pixels to the right and left of J are available) is computed as: Output=C0*(A+A)+C1*(B+B)+C2*(E+C)+C3*(D+D)+ C4*(C+E)+C5*(F+N)+C6*(G+M)+C7*(H+L)+C8*(I+K)+ C9*J.

Figure 7:
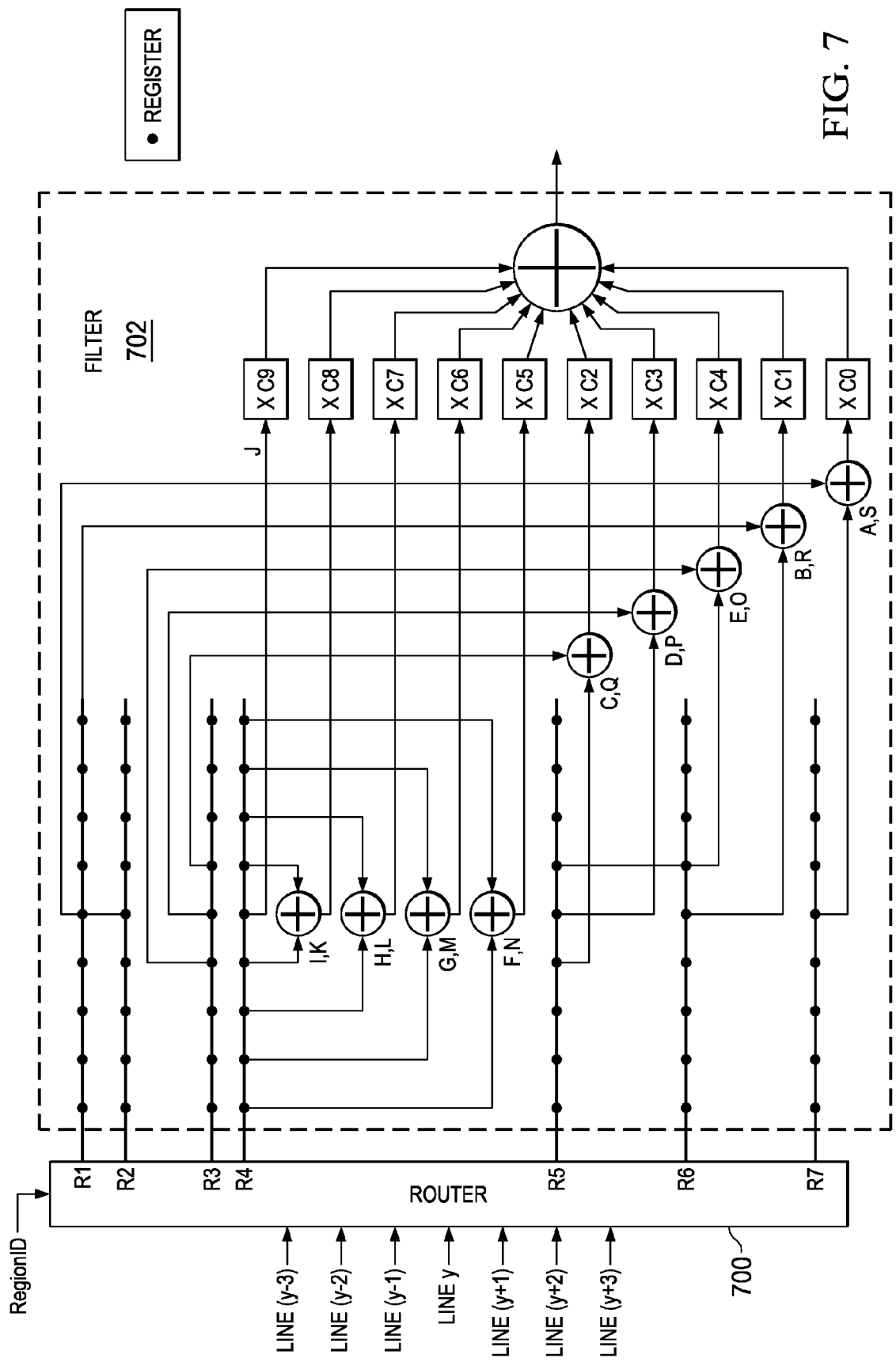
FIG. 7 is a block diagram of an example hardware architecture for ALF using the virtual boundary processing of FIGS. 5A-5I or FIGS. 6A-6I.

FIG. 7 is a block diagram of a hardware architecture implementing the above ALF filtering techniques using virtual boundaries of FIGS. 5A-5I and FIGS. 6A-6I. This hardware architecture includes a router 700 connected to an symmetric 2D FIR filter circuit 702 configured to perform computations of the filter of FIG. 1, i.e., Output=C0*(A+ S)+C1*(B+R)+C2*(C+Q)+C3*(D+P)+C4*(E+O)+C5*(F+ N)+C6*(G+M)+C7*(H+L)+C8*(I+K)+C9*J. The router 700 includes outputs R1-R7, each of which is connected to one of seven multi-bit shift registers in the filter 702, each having nine multi-bit registers. In general, the number of multi-bit shift registers in a symmetric 2D FIR filter circuit and the number of multi-bit registers in each multi-bit shift register is determined based on the vertical and horizontal dimensions of the 2D symmetric filter implemented by the filter circuit. Thus, for the filter shape of FIG. 1, there is one multi-bit shift register for each row (line) of pixels in the filter and each multi-bit shift register includes one multi-bit register for each column of pixels in the filter shape. The router 700 has seven inputs, the contents of which the router 700 sends to the outputs R1-R7, and thus to the corresponding shift registers, based on a region identifier control 704 (RegionID). The router 700 may be implemented, for example, as a crossbar switch with mapping circuitry to map the region identifier to appropriate switch settings or a series of multiplexors with mapping (control) circuitry to map the region identifier to the appropriate control signals for the multiplexors.

The seven inputs of the router 700 are supplied from seven consecutive lines (rows) of pixels within the virtual boundaries of the LCU being filtered. Table 1 shows the values of the RegionID for the technique of FIGS. 5A-5I, the description of the region corresponding to each RegionID value, and which input line is directed by the router 700 to which output line R1-R7 for each RegionID value. Table 2 shows the values of the RegionID for the technique of FIGS. 6A-6I, the description of the region corresponding to each RegionID value, and which input line is directed by the router 700 to which output line R1-R7 for each RegionID value. In FIG. 7, Table 1, and Table 2, y denotes the y coordinate of the current pixel being filtered, e.g., the y coordinate of pixel J in the examples of FIGS. 5A-5I and FIGS. 6A-6I. Referring to the notation of FIG. 2, the register set R1 corresponds to pixel value A, the register set R2 corresponds to pixel value B, the register set R3 corresponds to pixel values C, D, and E, the register set R4 corresponds to pixel values F-N, the register set R5 corresponds to pixel values O, P, and Q, the register set R6 corresponds to the pixel value R, and the register set R7 corresponds to the pixel value S.

The regions in Table 1 and Table 2 are defined such that the router 700 (responsive to the supplied RegionID) directs the values of I, J, K, i.e., line y, where needed to supply the padded values for the filter computations. No multiplexors as in the hardware architecture of FIG. 4 are needed.

Pairs of registers are connected to adders to perform the additions of the pixel values at symmetric positions in the filter shape. Each adder is connected to a multiplier that multiplies the adder output with the coefficient value for the symmetric positions. An additional multiplier is connected to the center register of the multi-bit shift register R4, which holds the pixel value J. This multiplier multiplies the pixel value by the center coefficient value (C9) of the filter shape. The multipliers are connected to a multi-input adder that adds the outputs of the multipliers to produce a filtered pixel value.

In general, the multi-bit shift registers operate a sliding window across seven rows of pixels between the virtual boundaries. After each filter computation, the window moves to the right by one pixel, i.e., the contents of the multi-bit registers of each multi-bit shift register are shifted to the right by one register, and a new pixel value is read into the leftmost register of each multi-bit shift register according to the value of the RegionID.

TABLE 2

| Region Description | RegionID | Line L1 | Line L2 | Line L3 | Line L4 | Line L5 | Line L6 | Line L7 |
|---|---|---|---|---|---|---|---|---|
| Region 302 and Line 4 of region 300 | 1 | y − 3 | y − 2 | y − 1 | y | y + 1 | y + 2 | y + 3 |
| Line 3 of region 300 and Line 1 of region 304 | 2 | y + 3 | y − 2 | y − 1 | y | y + 1 | y + 2 | y + 3 |
| Line 2 of region 300 and Line 2 of region 304 | 3 | y + 3 | y + 2 | y − 1 | y | y + 1 | y + 2 | y + 3 |
| Line 1 of region 300 and Line 3 of region 304 | 4 | y + 3 | y + 2 | y + 1 | y | y + 1 | y + 2 | y + 3 |

Figure 8:
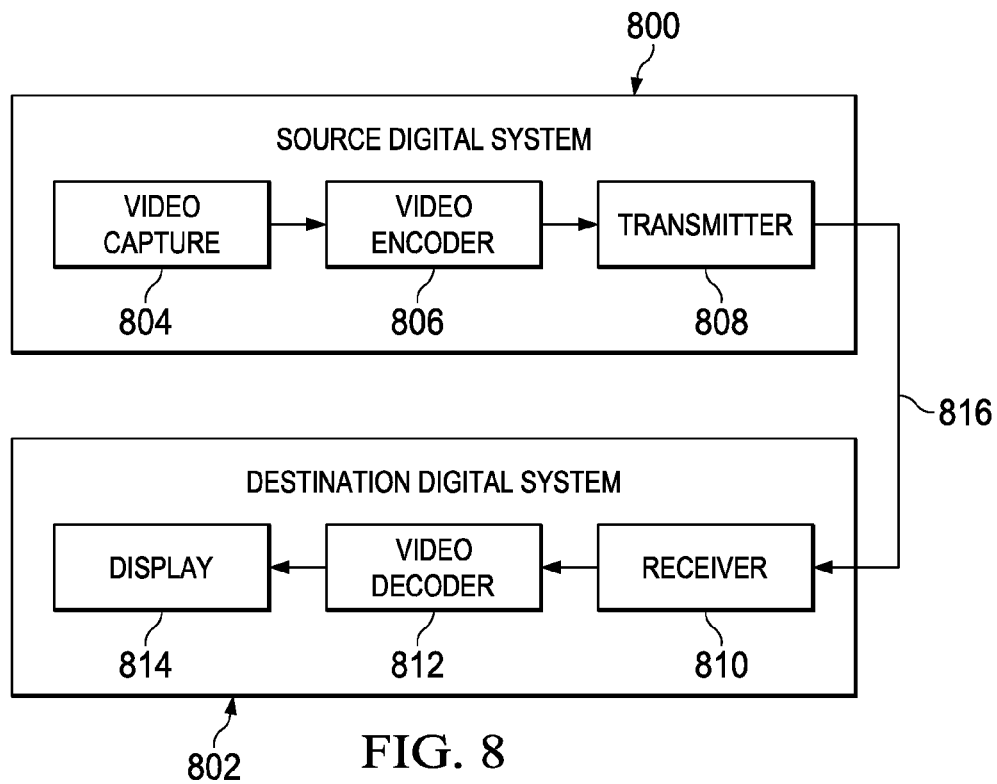
FIG. 8 is a block diagram of a digital system.

FIG. 8 shows a block diagram of a digital system that includes a source digital system 800 that transmits encoded video sequences to a destination digital system 802 via a communication channel 816. The source digital system 800 includes a video capture component 804, a video encoder component 806, and a transmitter component 808. The video capture component 804 is configured to provide a video sequence to be encoded by the video encoder component 806. The video capture component 804 may be, for example, a video camera, a video archive, or a video feed from a video content provider. In some embodiments, the video capture component 804 may generate computer graphics as the video sequence, or a combination of live video, archived video, and/or computer-generated video.

The video encoder component 806 receives a video sequence from the video capture component 804 and encodes it for transmission by the transmitter component 808. The video encoder component 806 receives the video sequence from the video capture component 804 as a sequence of pictures, divides the pictures into largest coding units (LCUs), and encodes the video data in the LCUs. The video encoder component 806 may be configured to apply techniques for adaptive loop filtering with virtual boundary processing during the encoding process as described herein. An embodiment of the video encoder component 806 is described in more detail herein in reference to FIG. 9.

The transmitter component 808 transmits the encoded video data to the destination digital system 802 via the communication channel 816. The communication channel 816 may be any communication medium, or combination of communication media suitable for transmission of the encoded video sequence, such as, for example, wired or wireless communication media, a local area network, or a wide area network.

The destination digital system 802 includes a receiver component 810, a video decoder component 812 and a display component 814. The receiver component 810 receives the encoded video data from the source digital system 800 via the communication channel 816 and provides the encoded video data to the video decoder component 812 for decoding. The video decoder component 812 reverses the encoding process performed by the video encoder component 806 to reconstruct the LCUs of the video sequence. The video decoder component 812 may be configured to apply techniques for adaptive loop filtering with virtual boundary processing during the decoding process as described herein. An embodiment of the video decoder component 812 is described in more detail below in reference to FIG. 10.

The reconstructed video sequence is displayed on the display component 814. The display component 814 may be any suitable display device such as, for example, a plasma display, a liquid crystal display (LCD), a light emitting diode (LED) display, etc.

In some embodiments, the source digital system 800 may also include a receiver component and a video decoder component and/or the destination digital system 802 may include a transmitter component and a video encoder component for transmission of video sequences both directions for video streaming, video broadcasting, and video telephony. Further, the video encoder component 806 and the video decoder component 812 may perform encoding and decoding in accordance with one or more video compression standards. The video encoder component 806 and the video decoder component 812 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 9:
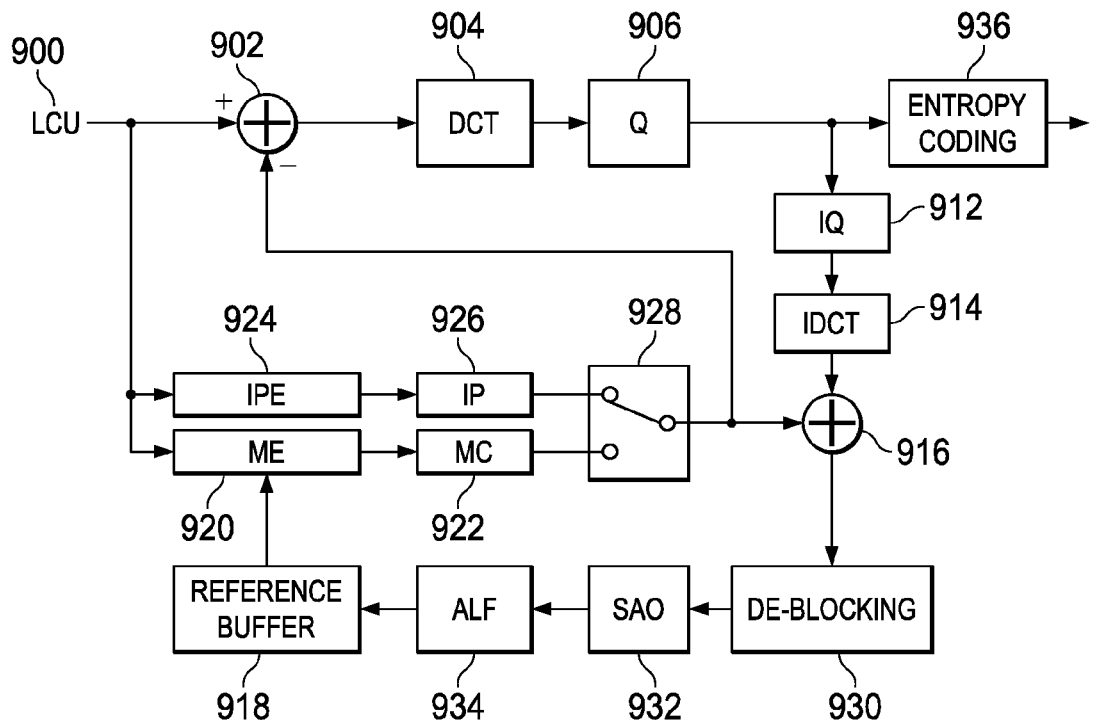
FIG. 9 is a block diagram of a video encoder.

FIG. 9 is a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The LCU processing receives LCUs 900 of the input video sequence from the coding control component and encodes the LCUs 900 under the control of the coding control component to generate the compressed video stream. The LCUs 900 in each picture are processed in row order. The LCUs 900 from the coding control component are provided as one input of a motion estimation component (ME) 920, as one input of an intra-prediction estimation component (IPE) 924, and to a positive input of a combiner 902 (e.g., adder or subtractor or the like). Further, although not specifically shown, the prediction mode of each picture as selected by the coding control component is provided to a mode decision component 928 and the entropy coding component 936.

The storage component 918 provides reference data to the motion estimation component 920 and to the motion compensation component 922. The reference data may include one or more previously encoded and decoded pictures, i.e., reference pictures.

The motion estimation component 920 provides motion data information to the motion compensation component 922 and the entropy coding component 936. More specifically, the motion estimation component 920 performs tests on CUs in an LCU based on multiple inter-prediction modes (e.g., skip mode, merge mode, and normal or direct inter-prediction), PU sizes, and TU sizes using reference picture data from storage 918 to choose the best CU partitioning, PU/TU partitioning, inter-prediction modes, motion vectors, etc. based on coding cost, e.g., a rate distortion coding cost. To perform the tests, the motion estimation component 920 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 920 provides the motion vector (MV) or vectors and the prediction mode for each PU in the selected CU partitioning to the motion compensation component (MC) 922.

The motion compensation component 922 receives the selected inter-prediction mode and mode-related information from the motion estimation component 920 and generates the inter-predicted CUs. The inter-predicted CUs are provided to the mode decision component 928 along with the selected inter-prediction modes for the inter-predicted PUs and corresponding TU sizes for the selected CU/PU/TU partitioning. The coding costs of the inter-predicted CUs are also provided to the mode decision component 928.

The intra-prediction estimation component 924 (IPE) performs intra-prediction estimation in which tests on CUs in an LCU based on multiple intra-prediction modes, PU sizes, and TU sizes are performed using reconstructed data from previously encoded neighboring CUs stored in a buffer (not shown) to choose the best CU partitioning, PU/TU partitioning, and intra-prediction modes based on coding cost, e.g., a rate distortion coding cost. To perform the tests, the intra-prediction estimation component 924 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 924 provides the selected intra-prediction modes for the PUs, and the corresponding TU sizes for the selected CU partitioning to the intra-prediction component (IP) 926. The coding costs of the intra-predicted CUs are also provided to the intra-prediction component 926.

The intra-prediction component 926 (IP) receives intra-prediction information, e.g., the selected mode or modes for the PU(s), the PU size, etc., from the intra-prediction estimation component 924 and generates the intra-predicted CUs. The intra-predicted CUs are provided to the mode decision component 928 along with the selected intra-prediction modes for the intra-predicted PUs and corresponding TU sizes for the selected CU/PU/TU partitioning. The coding costs of the intra-predicted CUs are also provided to the mode decision component 928.

The mode decision component 928 selects between intra-prediction of a CU and inter-prediction of a CU based on the intra-prediction coding cost of the CU from the intra-prediction component 926, the inter-prediction coding cost of the CU from the motion compensation component 922, and the picture prediction mode provided by the coding control component. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 936.

The output of the mode decision component 928, i.e., the predicted PUs, is provided to a negative input of the combiner 902 and to the combiner 938. The associated transform unit size is also provided to the transform component 904. The combiner 902 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 904 performs block transforms on the residual CUs to convert the residual pixel values to transform coefficients and provides the transform coefficients to a quantize component 906. More specifically, the transform component 904 receives the transform unit sizes for the residual CU and applies transforms of the specified sizes to the CU to generate transform coefficients. Further, the quantize component 906 quantizes the transform coefficients based on quantization parameters (QPs) and quantization matrices provided by the coding control component and the transform sizes and provides the quantized transform coefficients to the entropy coding component 936 for coding in the bit stream.

The entropy coding component 936 entropy encodes the relevant data, i.e., syntax elements, output by the various encoding components and the coding control component using context-adaptive binary arithmetic coding (CABAC) to generate the compressed video bit stream. Among the syntax elements that are encoded are picture parameter sets, flags indicating the CU/PU/TU partitioning of an LCU, the prediction modes for the CUs, and the quantized transform coefficients for the CUs. The entropy coding component 936 also codes relevant data from the in-loop filters (described below) such as the adaptive loop filter (ALF) coefficients for each picture.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 912, which outputs a reconstructed version of the transform result from the transform component 904. The dequantized transform coefficients are provided to the inverse transform component (IDCT) 914, which outputs estimated residual information representing a reconstructed version of a residual CU. The inverse transform component 914 receives the transform unit size used to generate the transform coefficients and applies inverse transform(s) of the specified size to the transform coefficients to reconstruct the residual values. The reconstructed residual CU is provided to the combiner 938.

The combiner 938 adds the original predicted CU to the residual CU to generate a reconstructed CU, which becomes part of reconstructed picture data. The reconstructed picture data is stored in a buffer (not shown) for use by the intra-prediction estimation component 924.

Various in-loop filters may be applied to the reconstructed picture data to improve the quality of the reference picture data used for encoding/decoding of subsequent pictures. The in-loop filters may include a deblocking filter component 930, a sample adaptive offset filter (SAO) component 932, and an adaptive loop filter (ALF) component 934. The in-loop filters 930, 932, 934 are applied to each reconstructed LCU in the picture and the final filtered reference picture data is provided to the storage component 918.

The ALF component 934 selectively applies a symmetric 2D finite impulse response (FIR) filter of the shape shown in FIG. 1 to blocks of the reconstructed picture. In general, for an LCU, the ALF component 934 determines a set of filter coefficients, and applies the filter to the LCU using the set of filter coefficients. The filter coefficients are determined using a standard Weiner filtering technique in which the objective is to determine parameters such that the mean squared error between the original input pixels and the filtered reconstructed pixels is minimized. In some embodiments, after the coefficients are determined, the filter is applied to the LCU as per the coefficients according to the technique of FIG. 5A-5I. In some embodiments, after the coefficients are determined, the filter is applied to the LCU as per the coefficients according to the technique of FIG. 6A-6I. In some embodiments, the ALF component 934 includes hardware circuitry as per FIG. 7.

Figure 10:
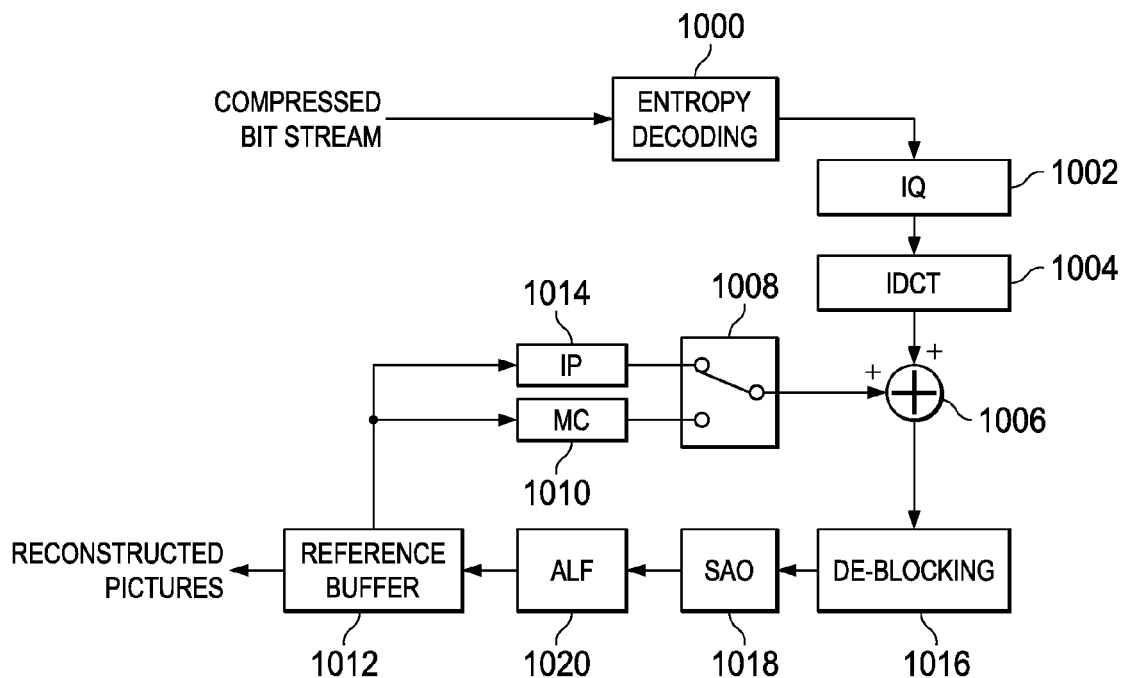
FIG. 10 is a block diagram of a video decoder.

FIG. 10 is a block diagram of an example video decoder. The video decoder operates to reverse the encoding operations, i.e., entropy coding, quantization, transformation, and prediction, performed by the video encoder of FIG. 9 to regenerate the pictures of the original video sequence. In view of the above description of a video encoder, one of ordinary skill in the art will understand the functionality of components of the video decoder without detailed explanation.

The entropy decoding component 1000 receives an entropy encoded (compressed) video bit stream and reverses the entropy encoding using CABAC decoding to recover the encoded syntax elements, e.g., CU, PU, and TU structures of LCUs, quantized transform coefficients for CUs, motion vectors, prediction modes, ALF coefficients, etc. The decoded syntax elements are passed to the various components of the decoder as needed. For example, decoded prediction modes are provided to the intra-prediction component (IP) 1014 or motion compensation component (MC) 1010. If the decoded prediction mode is an inter-prediction mode, the entropy decoder 1000 reconstructs the motion vector(s) as needed and provides the motion vector(s) to the motion compensation component 1010. In another example, decoded ALF coefficients are provided to the ALF component 1020.

The inverse quantize component (IQ) 1002 de-quantizes the quantized transform coefficients of the CUs. The inverse transform component 1004 transforms the frequency domain data from the inverse quantize component 1002 back to the residual CUs. That is, the inverse transform component 1004 applies an inverse unit transform, i.e., the inverse of the unit transform used for encoding, to the de-quantized residual coefficients to produce reconstructed residual values of the CUs.

A residual CU supplies one input of the addition component 1006. The other input of the addition component 1006 comes from the mode switch 1008. When an inter-prediction mode is signaled in the encoded video stream, the mode switch 1008 selects predicted PUs from the motion compensation component 1010 and when an intra-prediction mode is signaled, the mode switch selects predicted PUs from the intra-prediction component 1014.

The motion compensation component 1010 receives reference data from the storage component 1012 and applies the motion compensation computed by the encoder and transmitted in the encoded video bit stream to the reference data to generate a predicted PU. That is, the motion compensation component 1010 uses the motion vector(s) from the entropy decoder 1000 and the reference data to generate a predicted PU.

The intra-prediction component 1014 receives reconstructed samples from previously reconstructed PUs of a current picture from the storage component 1012 and performs the intra-prediction computed by the encoder as signaled by an intra-prediction mode transmitted in the encoded video bit stream using the reconstructed samples as needed to generate a predicted PU.

The addition component 1006 generates a reconstructed CU by adding the predicted PUs selected by the mode switch 1008 and the residual CU. The output of the addition component 1006, i.e., the reconstructed CUs, is stored in the storage component 1012 for use by the intra-prediction component 1014.

In-loop filters may be applied to reconstructed picture data to improve the quality of the decoded pictures and the quality of the reference picture data used for decoding of subsequent pictures. The applied in-loop filters are the same as those of the encoder, i.e., a deblocking filter 1016, a sample adaptive offset filter (SAO) 1018, and an adaptive loop filter (ALF) 1020. The in-loop filters may be applied on an LCU-by-LCU basis and the final filtered reference picture data is provided to the storage component 1012.

The ALF component 1020 applies the same symmetric 2D FIR filter as the encoder to LCUs of the reconstructed picture using the sets of coefficients signaled in the compressed bit stream. More specifically, for each LCU in a reconstructed picture, the ALF component 1020 applies the filter using the filter coefficients determined for that LCU by the encoder. In some embodiments, the filter is applied to the LCU as per the coefficients according to the technique of FIG. 5A-5I. In some embodiments, the filter is applied to the LCU as per the coefficients according to the technique of FIG. 6A-6I. In some embodiments, the Alf component 1020 includes hardware circuitry as per FIG. 7.

Figure 11:
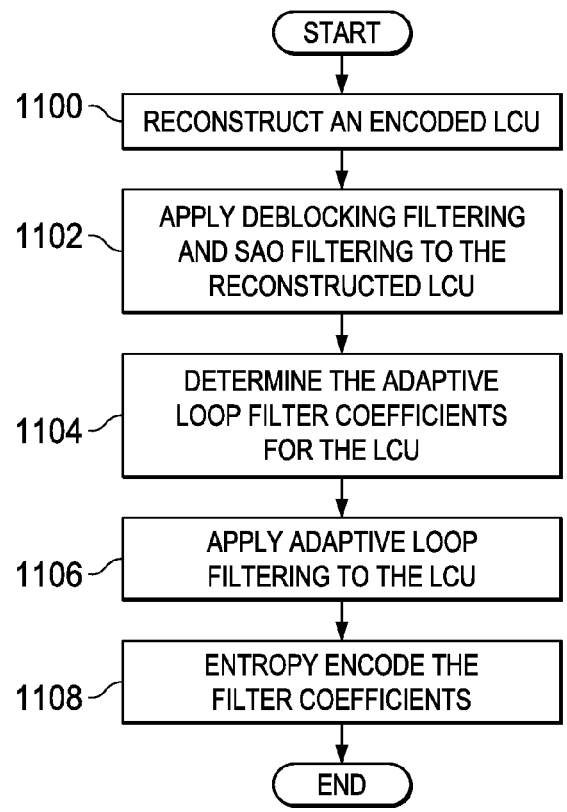
FIGS. 11 and 12 are flow diagrams of methods.

FIG. 11 shows a flow diagram of a method for adaptive loop filtering of a reconstructed LCU in a video encoder. Initially, an encoded LCU is reconstructed 1100 in the embedded decoder of the video encoder. Deblocking filtering and SAO filtering (if enabled) are then applied 1102 to the reconstructed LCU. A set of filter coefficients for the adaptive loop filter are then determined 1104 for the LCU. The determination of the set of filter coefficients may be performed using any suitable technique. Adaptive loop filtering is then applied 1106 to the reconstructed LCU. In some embodiments, the filter is applied to the LCU according to the technique of FIG. 5A-5I. In some embodiments, the filter is applied to the LCU according to the technique of FIG. 6A-6I.

Figure 12:
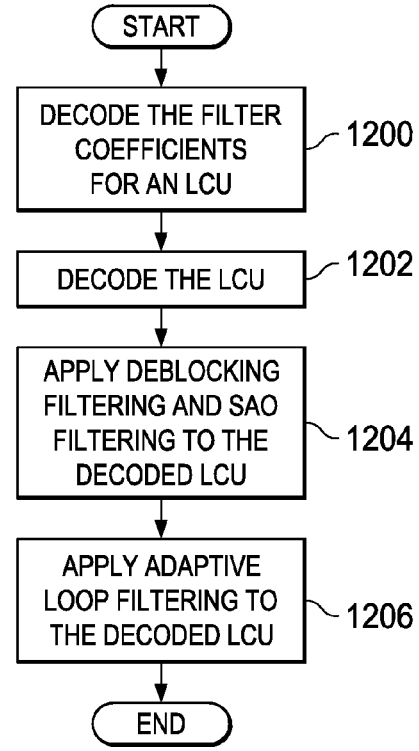

FIG. 12 shows a flow diagram of a method for adaptive loop filtering of a reconstructed LCU in a video decoder. Initially, the filter coefficients for an LCU are entropy decoded 1200 from the encoded bit stream. The entropy decoding performs the inverse to the entropy encoding performed by the encoder that generated the bit stream. The LCU is also decoded 1202 from the encoded bit stream. Deblocking filtering and SAO filtering (if enabled) are applied 1204 to the reconstructed LCU, followed by adaptive loop filtering 1206. In some embodiments, the ALF filter is applied to the LCU according to the technique of FIG. 5A-5I. In some embodiments, the ALF filter is applied to the LCU according to the technique of FIG. 6A-6I.

Figure 13:
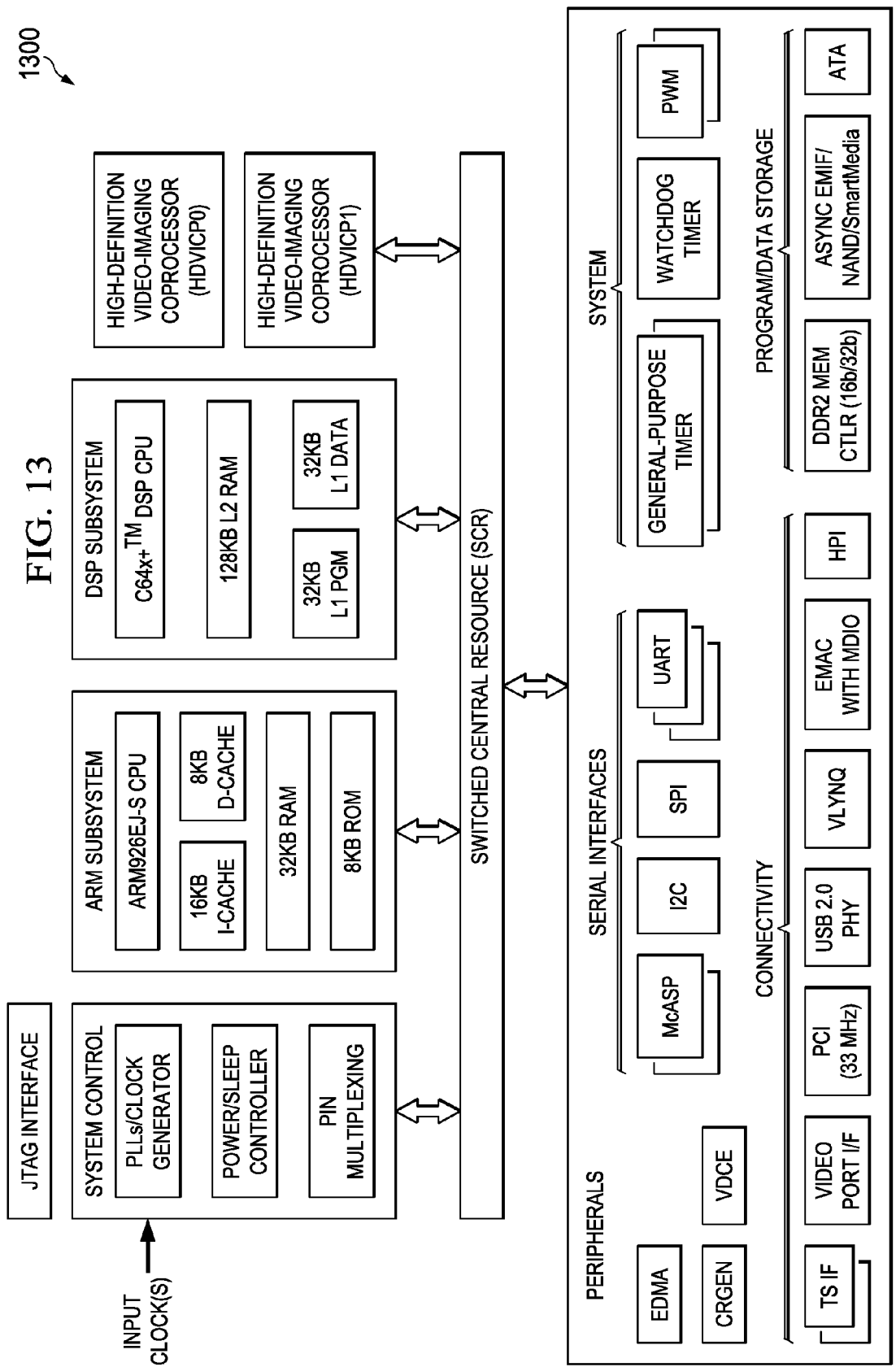
FIG. 13 is a block diagram of an illustrative digital system.

Embodiments of the methods, encoders, and decoders described herein may be implemented for virtually any type of digital system (e.g., a desk top computer, a laptop computer, a tablet computing device, a netbook computer, a handheld device such as a mobile (i.e., cellular) phone, a personal digital assistant, a digital camera, etc.). FIG. 13 is a block diagram of an example digital system suitable for use as an embedded system that may be configured to perform ALF filtering techniques as described herein during encoding of a video stream and/or the decoding of an encoded video bit stream. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 1300 is a programmable platform designed to meet the processing needs of applications such as video encode/decode/transcode/transrate, video surveillance, video conferencing, set-top box, medical imaging, media server, gaming, digital signage, etc. The SoC 1300 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 1300 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+™ core with a very-long-instruction-word (VLIW) architecture. In general, the ARM is responsible for configuration and control of the SoC 1300, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 1300 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 13, the SoC 1300 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, intra-prediction, transformation, quantization, and in-loop filtering. Further, the distinct circuitry in the HDVICP coprocessors that may be used for specific computation operations is designed to operate in a pipeline fashion under the control of the ARM subsystem and/or the DSP subsystem.

As was previously mentioned, the SoC 1300 may be configured to perform ALF during video encoding and/or decoding of an encoded video bit stream using techniques described herein. For example, the coding control of the video encoder of FIG. 9 may be executed on the DSP subsystem or the ARM subsystem and at least some of the computational operations of the block processing, including the intra-prediction and inter-prediction of mode selection, transformation, quantization, entropy encoding, and in-loop filtering may be executed on the HDVICP coprocessors. At least some of the computational operations of the ALF filtering during encoding of a video stream may also be executed on the HDVICP coprocessors. Similarly, at least some of the computational operations of the various components of the video decoder of FIG. 10, including entropy decoding, inverse quantization, inverse transformation, intra-prediction, motion compensation, and in-loop filtering may be executed on the HDVICP coprocessors. Further, at least some of the computational operations of the ALF filtering during decoding of an encoded video bit stream may also be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein in which the filter shape of FIG. 1 is assumed. One of ordinary skill in the art will understand embodiments for other suitable symmetric 2D filter shapes, i.e., embodiments in which the filter has more or fewer than ten taps and/or the horizontal and/or vertical dimensions differ from those of the filter of FIG. 1.

In another example, embodiments have been described herein in which the virtual boundaries are formed by shifting the horizontal boundaries of an LCU up by four rows. One of ordinary skill in the art will understand that the number of rows that the horizontal boundaries are shifted depends on the height (vertical size) of the particular filter shape.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. An apparatus configured for applying an adaptive loop filter to reconstructed pixel values of a reconstructed largest coding unit (LCU) of a reconstructed picture, wherein the adaptive loop filter is a symmetric two-dimensional (2D) finite impulse response (FIR) filter, the apparatus comprising:

a filter circuit configured to perform computational operations of the symmetric 2D FIR filter, wherein the filter circuit comprises one input for each vertical coefficient position of the symmetric 2D FIR filter; and a router comprising an input and an output for each vertical coefficient position of the symmetric 2D FIR filter, wherein each router output is operatively connected to a unique one of the filter circuit inputs, wherein each router input is operatively connected to receive reconstructed pixel values from a unique one of consecutive rows within horizontal virtual boundaries of the reconstructed LCU, wherein a central row in the consecutive rows comprises reconstructed pixels to be filtered and is operatively connected to a central router input, and wherein the router is configured to direct pixel values received at the router inputs to the router outputs based on a value of a region identifier, wherein when a value of the region identifier corresponds to a region of the reconstructed LCU comprising a row of reconstructed pixels at a top horizontal virtual boundary of the reconstructed LCU and a row of reconstructed pixels at a bottom horizontal virtual boundary of the reconstructed LCU, the router directs reconstructed pixel values received at the central router input to all router outputs.

2. The apparatus of claim 1, wherein the symmetric 2D FIR filter is a 10-tap FIR filter with a vertical size of 7 and a horizontal size of 9.

3. The apparatus of claim 1, wherein the router includes a crossbar switch.

4. The apparatus of claim 1, wherein the router is a crossbar switch.

* * * * *